United States Patent [19]
Kobayashi

[11] Patent Number: 5,963,339
[45] Date of Patent: Oct. 5, 1999

[54] FACSIMILE APPARATUS CAPABLE OF EDITING AND TRANSMITTING INPUT INFORMATION

[75] Inventor: Yoshikazu Kobayashi, Tokyo, Japan

[73] Assignee: NEC Corporation, Tokyo, Japan

[21] Appl. No.: 08/841,557

[22] Filed: Apr. 30, 1997

[30] Foreign Application Priority Data

Apr. 30, 1996 [JP] Japan ................................. 8-109262

[51] Int. Cl.$^6$ .................................................. H04N 1/32
[52] U.S. Cl. .......................................... 358/439; 358/435
[58] Field of Search .................................. 380/28, 10, 17, 380/49, 46; 358/439, 440, 434, 435, 436, 438, 468, 400, 401, 405, 496, 441; 379/100, 209

[56] References Cited

U.S. PATENT DOCUMENTS

| 5,057,941 | 10/1991 | Moriya | 358/440 |
| 5,408,340 | 4/1995 | Edamura | 358/468 |
| 5,432,617 | 7/1995 | Sugishima | 358/435 |
| 5,535,277 | 7/1996 | Shibata | 380/28 |

FOREIGN PATENT DOCUMENTS 7-183989  7/1995  Japan ................................. H04N 1/00

*Primary Examiner*—Jose L. Couso
*Assistant Examiner*—Duy M. Dang
*Attorney, Agent, or Firm*—Sughrue, Mion, Zinn, Macpeak & Seas, PLLC

[57] ABSTRACT

The input information read by the scanner section 101 and the input information received by the modem section 106 are stored in the storage section 102. The analysis circuit 107 analyzes an identifier from a signal received at the modem 106. The management control section 104 divides the input information output from the scanner and input information output from the modem 106 corresponding to the command from the operation panel 103, controls the storage section 102 to store the divided input information in a designated directory of the storage section 102 in accordance with the command from the operation panel 103, and reads the input information stored in a directory in the storage section 102 corresponding to an identifier which is received and analyzed by the analysis section 107, and transmits, through the modem, the input information to a facsimile apparatus on the other end of the line which has transmitted the identifier.

18 Claims, 24 Drawing Sheets

FACSIMILE APPARATUS CAPABLE OF EDITING AND TRANSMITTING INPUT INFORMATION

BACKGROUND OF THE INVENTION

1. Field of the Invention

The present invention relates to a facsimile apparatus, and more particularly, relates to a facsimile apparatus for performing information service to edit and transmit information stored in the facsimile apparatus to a facsimile on the other end of the line.

2. Description of the Related Art

As a conventional facsimile apparatus connected to network, there is proposed a Japanese Patent Application Unexamined Publication No. 7-183989. Such an apparatus has a configuration in which elements of the facsimile apparatus are jointly used as those of a modem or a printer. The publication 7-183989 teaches sharing resources of the facsimile apparatus with other apparatuses in LAN (Local Area Network).

Japanese Patent Application Unexamined Publication No. 1-264471 discloses a facsimile apparatus provided with a floppy disc or an optical disc as an external storage device.

However, such prior art facsimile apparatuses are not designed to perform information service and have various problems to be solved to give service of this kind.

Specifically, the prior art apparatus has first a disadvantage in that it cannot divide and file input information fetched by a scanner section from paper or divide and transmit input information. There are proposed facsimile apparatuses which designate a paper area to be read using a read area designation section in advance and transmit an image signal corresponding to the designated area of an image read by a scanner section. However, it fails to perform information service due to lack of a function of freely dividing an image signal generated by reading an image on paper by using a scanner section or an image signal transmitted from a facsimile apparatus on the other end of the line, forming a plurality of divided image areas and editing and transmitting necessary portion of the image areas, or a function of returning the divided image areas by a command from the facsimile apparatus on the other end of the line.

Second, the prior art apparatus has a disadvantage in that since a read area designation section cannot freely set division image areas, it is required to cut a portion of paper on which a needed piece of information is printed and put it on a form (e.g. A4 form) to transmit the needed piece of information. It thus takes time, labor and cost.

Third, it does not at all disclose how data structure is configured to provide information service using a facsimile. Nor does it disclose what functions are necessary to improve facility. Therefore, it is required to develop basic techniques of a facsimile apparatus which can perform information service.

SUMMARY OF THE INVENTION

The present invention has been made to solve the above-mentioned disadvantages of prior art. It is, therefore, the object of the present invention to provide a facsimile apparatus capable of performing information service at simple operations.

The facsimile apparatus according to the present invention is characterized by comprising a scanner for reading information recorded on a form; a command input panel for inputting a command from an operator; a communication circuit for transmitting and receiving a signal through a telephone line; a storage circuit for storing input information read by the scanner and input information received at the communication circuit; an analysis circuit for analyzing an identifier from a signal received at the communication circuit; and a control circuit.

Furthermore, the control circuit of the facsimile apparatus of the present invention comprises an input information division circuit for dividing input information output from the scanner or input information output from the communication circuit; a storage control circuit for controlling the storage circuit to store the input information divided by the input information division circuit in a designated directory of the storage circuit in accordance with the command of the command input panel; and a transmit control circuit for reading input information associated with the identifier analyzed by the analysis circuit from the storage circuit and for controlling the communication circuit to transmit the input information to a facsimile apparatus on the other end of the line which has transmitted the identifier.

With such an arrangement, the facsimile apparatus on the other end of the line designates a directory of the facsimile apparatus of the present invention by using an identifier. The input information stored in the directory is returned, through the modem, from the facsimile apparatus of the present invention to the facsimile apparatus on the other end of the line.

Since input information, which has been divided, is stored in the storage circuit, the apparatus on the other end of the line needs to request only the necessary pieces of the information by using the identifier. Communication time can be therefore shortened.

Input information includes division information of information scanned by the scanner and information received at the communication circuit, for example, a modem. The input information is stored in a directory of the storage circuit based on the command of the command input panel. The input information is divided for every page, for example. Part of one page of the information is transferred to a different page by directory designation and stored in the storage circuit. In addition, it is possible to transfer the scanned information to the directory which stores the information received at the modem.

The first control function of the transmit control circuit controls the communication circuit to transmit input information in a first directory to the facsimile apparatus on the other end of the line through the modem if the identifier analyzed by the analysis circuit designates the first directory.

The second control function of the transmit control circuit controls a printer to print out input information associated with the identifier analyzed by the analysis circuit based on the command of the command input panel.

The third control function of the transmit control circuit controls the communication circuit to transmit information about the structure of a directory in the storage circuit to the facsimile apparatus on the other end of the line, if the identifier analyzed by the analysis circuit requests the structure of the directory in the storage circuit. This function enables the facsimile apparatus on the other end of the line to know in advance which directory should be requested by using the identifier.

The fourth control function of the transmit control circuit controls the communication circuit to transmit part of respective pieces of input information stored in the storage circuit to the facsimile apparatus on the other end of the line, if the identifier analyzed by the analysis circuit requests summary information of the respective pieces of input information stored in the storage circuit. This function enables the facsimile apparatus according to the present invention to notify the apparatus on the other end of the line of the outline of the content of the input information stored in the storage circuit at short time.

The control circuit of the present invention further comprises a directory association circuit for associating respective directories in the storage circuit based on the command of the command input panel. The transmit control circuit controls the communication circuit to transmit, input information in a directory necessary to transmit to the facsimile apparatus on the other end of the line and associated input information stored in a directory associated with the directory of the input information by said directory association circuit, to the facsimile apparatus on the other end of the line.

Moreover, the facsimile apparatus in another embodiment according to the present invention comprises a clock section connected to the control circuit, for outputting time information. The storage control circuit stores the time information output from the clock section as well as the input information in the storage circuit when the input information is stored in the storage circuit. The clock section can also store signal arrival time and line disconnection time.

The storage control circuit can store rewrite frequency as well as the input information if the input information to be stored in the storage circuit is overwritten in a single directory.

Another facsimile apparatus according to the present invention comprises: a scanner for reading information recorded on a form; a command input panel for inputting a command from an operator; a communication circuit for transmitting and receiving a signal through a telephone line; a storage circuit for storing input information read by the scanner and input information received at the communication circuit; an analysis circuit for analyzing number data received from a facsimile apparatus on the other end of the line and analyzing an identifier thereof received from the facsimile apparatus; and control means. The control means comprises: an input information division circuit for dividing input information output from the scanner or input information output from the communication circuit; storage control circuit for controlling the storage circuit to store the input information divided by the input information division circuit in a designated directory of the storage circuit in accordance with the command of the command input panel; and transmit control means for controlling the storage control circuit to read input information associated with the identifier analyzed by the analysis circuit from the storage circuit, and for controlling the communication circuit to transmit the input information to a terminal corresponding to the number data analyzed by the analysis circuit.

With such an arrangement, a directory command is issued from the first facsimile apparatus by using an identifier to the facsimile apparatus (second apparatus) of the present invention. The input information stored in the directory is transmitted to a designated third facsimile apparatus by the first facsimile apparatus.

DETAILED DESCRIPTION OF THE PREFERRED EMBODIMENTS

Figure 1:
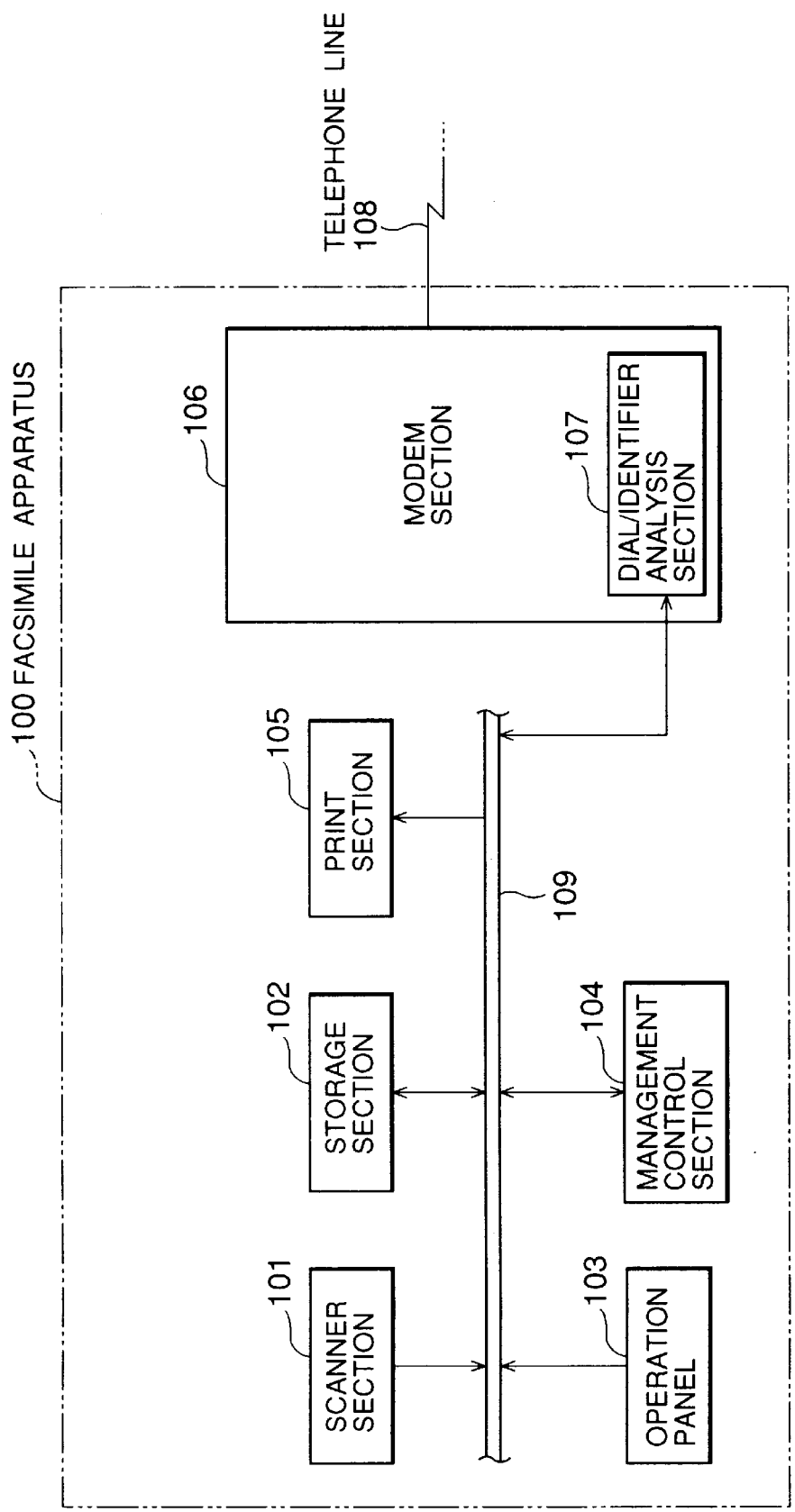
FIG. 1 is a block diagram showing a facsimile apparatus of the first embodiment according to the present invention.

Referring first to FIG. 1, facsimile apparatus 100 according to a first embodiment comprises scanner section 101 for reading information recorded on a form by scanning the form, operation panel 103 having an input section for inputting a command from an operator and a display section for displaying various information, modem section 106 having a modem circuit for modulating and demodulating a signal transmitted or received through telephone line 108 and a network control circuit connecting the telephone line 108, storage section 102 for storing input information (or scanned input information) read by the scanner section 101, input information (or received input information) received at the modem section 106 and filed information thereof, print section 105 for printing the input information-turned files stored in the storage section 102 and management control section 104 for controlling operations of respective sections through bus 109.

The input information (or scanned input information) output from the scanner section 101 or that (or received input information) output from the modem section 106 is stored in a temporary storage area of the storage section 102.

Figure 18:
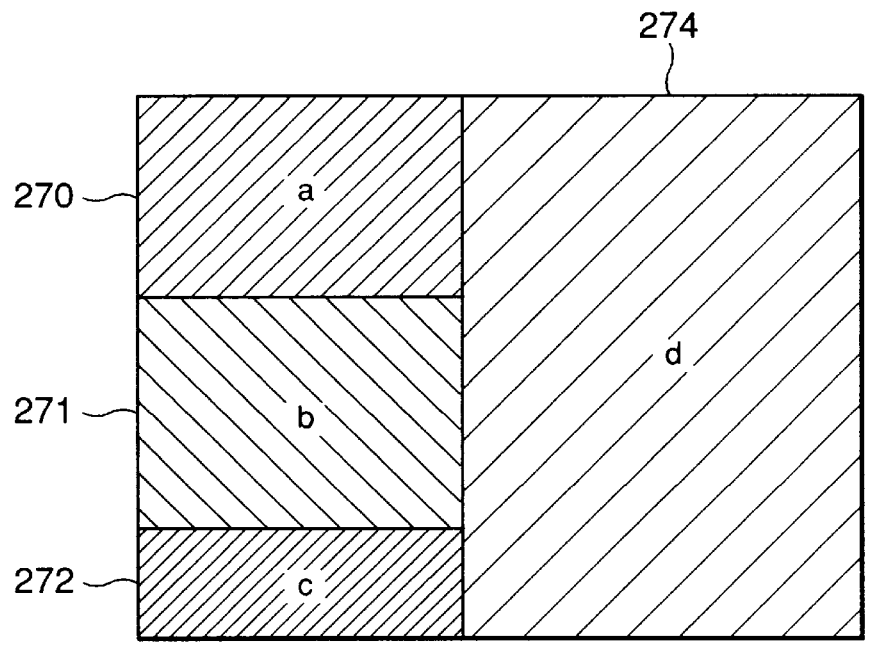
FIG. 18 is a plan view showing a page of information divided by the input information division processing.

The display section of the operation panel 103 has a function of displaying the input information temporarily stored in the storage section 102 for every page. At the time of making files out of the input information of the displayed pages in the storage section 102, the operation panel 103 issues a command to partially store the pages of input information by designating the coordinate of the part of each page to be made into a file. This function makes it possible to divide a page into a plurality of blocks, for example, 270, 271, 272 and 274 as shown in FIG. 18 and to file and store them separately. In addition, it makes it possible to designate a storage portion or a directory in which information is stored as a file and to store the information (block) on part of the page in the file of a different page. This is directory designation editing, which will be described later.

The modem section 106 is provided with dial/identifier analysis section 107 for analyzing an addition number (such as a telephone number of a facsimile apparatus on the other end of the line) and an identifier from a signal received after line connection is established. The dial/identifier analysis section 107 detects, from dial information, the telephone number of the facsimile apparatus from which the signal received at the modem section 106 is transmitted. The section 107 also analyses what kind of information the facsimile apparatus on the other end of the line requires based on the identifier, and outputs the analysis result to the management control section 104.

The addition number and identifier are received through non-standard protocol of facsimile communications. Whether or not the facsimile apparatus 100 executes non-standard communications protocol is judged by using an initial identification signal or a digital identification signal received after the establishment of line connection.

Figure 2:
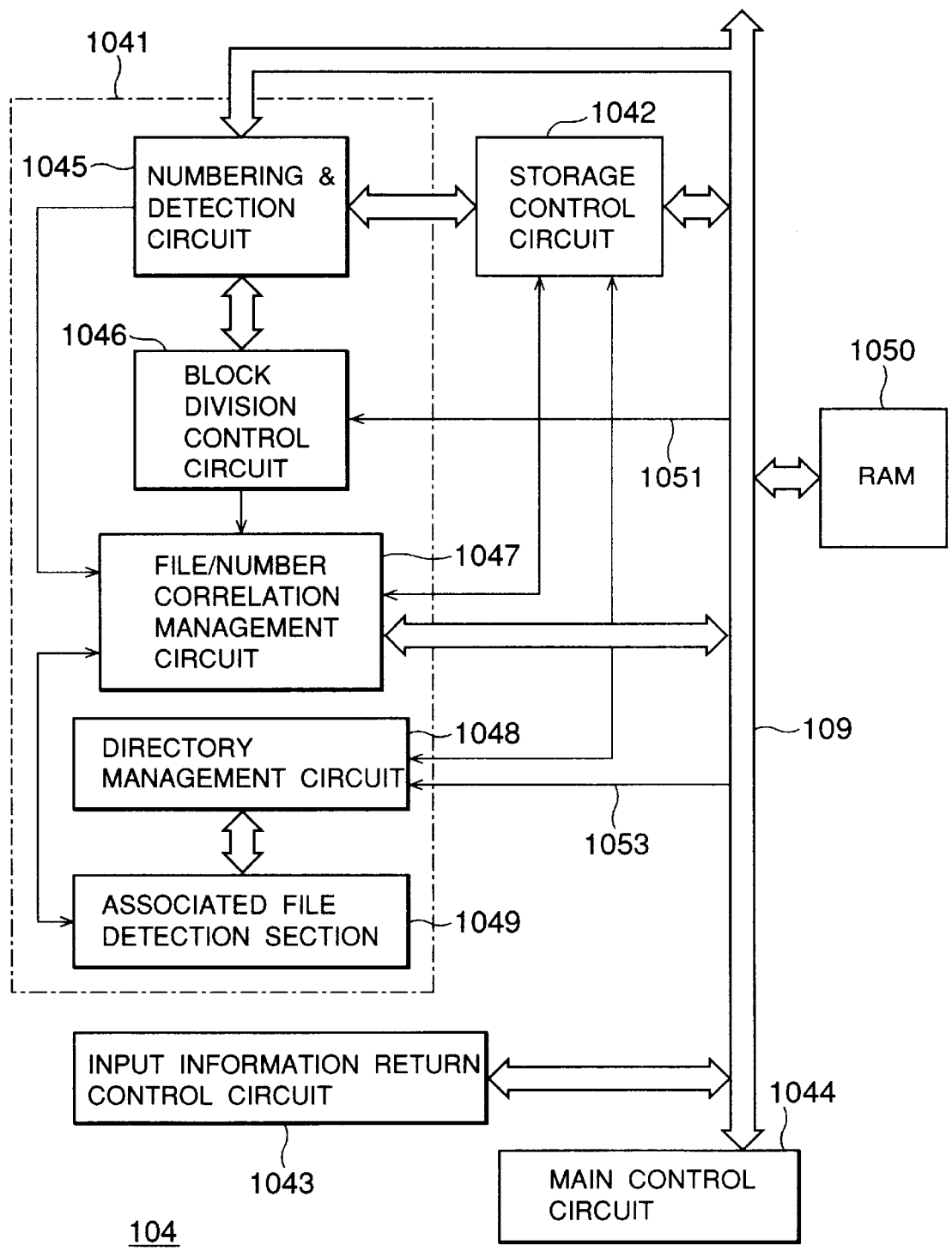
FIG. 2 is a block diagram showing the structure of a management control section of the facsimile apparatus shown in FIG. 1.

Referring now to FIG. 2, the management control section 104 comprises input information division circuit 1041 for dividing input information (scanned input information and received input information) stored in the temporary storage area of the storage section 102 for every page, storage control circuit 1042, input information return control circuit 1043, RAM 1050 and main control circuit 1044 for controlling the entirety of the apparatus.

The input information division circuit 1041 has a function of dividing input information on each page, which is the content of information service, into a plurality of block information according to a command from the operation panel 103, thereby obtaining filed information based on file names input from the operation panel 103. The input information division circuit 1041 also has a function of automatically dividing a page based on the density of an input image or spaces. The operation panel 3 determines on which division operation is based.

Moreover, the input information division circuit 1041 executes directory management for storing divided block information or undivided input information of a page as information of a different page.

The storage control circuit 1042 converts block information divided in the input information division circuit 1041 or undivided input information into file information, and controls the storage section 102 through the bus 109 to store the file information in a directory designated by the operation panel 103 shown in FIG. 1 or in a predetermined directory of the storage section 102. File information therefore contains input information or block information indicating information service.

Figure 3:
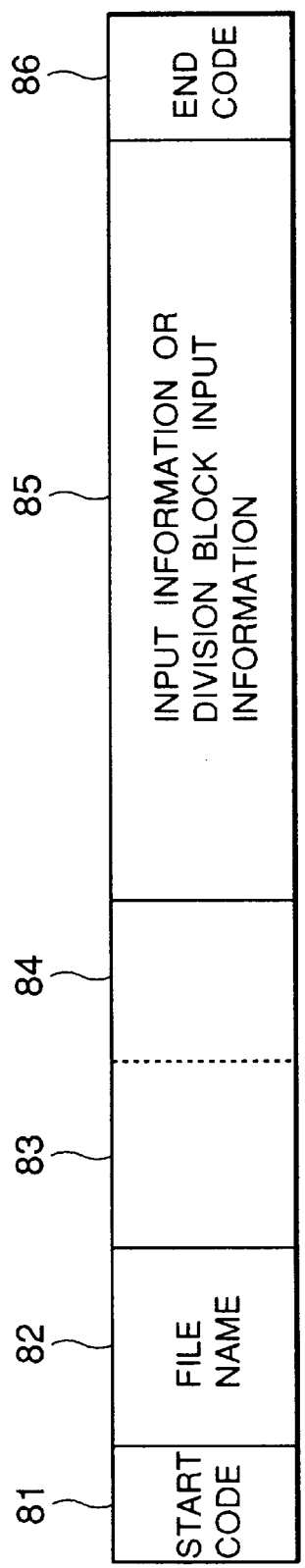
FIGS. 3 and 4 show the file structure of input information stored in a storage section of the facsimile apparatus shown in FIG. 1.
Figure 4:
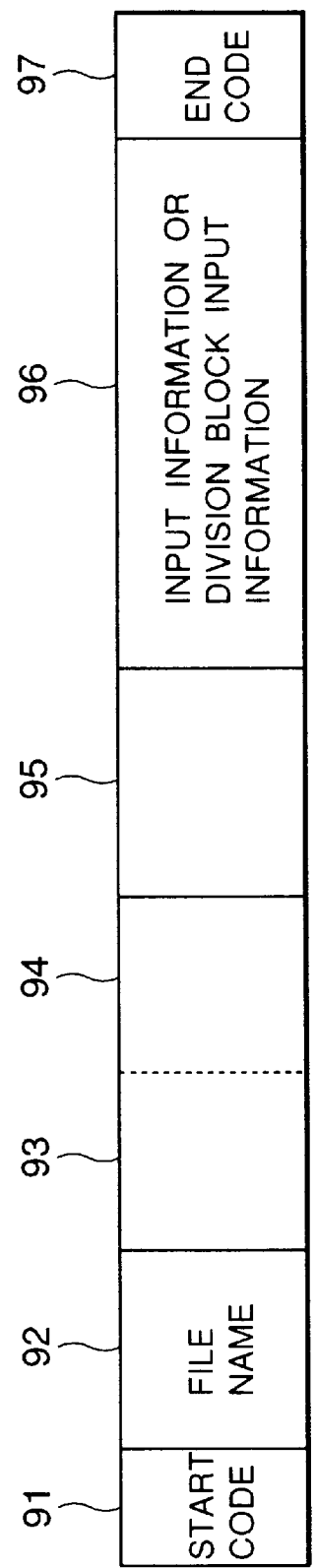

FIGS. 3 and 4 illustrate file information stored in the storage section 102 by the storage control circuit 1042. In FIGS. 3 and 4, file information consists of start code 81 (91), file name 82 (92), input information number 83 (93) or block identification number 84 (94), access-related information 95 (shown in FIG. 4 only), input information or division block information 85 (96) and end code 86 (97).

The start code 81 (91) and end code 86 (97) indicate the start and end of the file, respectively. The input information number 83 (93) is an identification number allotted to the input information for every page. The block identification number 84 (94) is a number allotted to every divided block. If a page of input information is not divided into a plurality of blocks, the block identification number 84 (94) is not allotted. If the page of input information is divided into a plurality of blocks, the block identification number 84 (94) is allotted instead of the input information number and the division block information 85 (96) into which input information is divided is stored as information service data. The access-related information 95 shown in FIG. 4 will be described later on.

Referring back to FIG. 2, numbering and detection circuit 1045 allots an input information number to input information temporarily stored in the storage section 102 shown in FIG. 1 for every page. The numbering and detection circuit 1045 also detects an input information number from the information from the storage control circuit 1042. The input information number allotted here is input information number 83 (93) shown in FIGS. 3 and 4.

Block division control circuit 1046 controls division of pages into a plurality of blocks by using control signal 1051 when the operation panel 103 issues a command to divide input information on respective pages into a plurality of blocks. The circuit 1046 also controls the numbering and detection circuit 1045 to allot block identification numbers (corresponding to block identification numbers 84 (94) in FIGS. 3 and 4) to blocks. The control signal 1051 is generated in the operation panel 103 to designate a divided image area of a block using a coordinate. The block division control circuit 1046 can automatically discriminate a photograph area from a character area based on the control signal 1051, and automatically divide a page into a plurality of blocks.

File-to-number correlation control circuit 1047 correlates an input information number with a file name (corresponding to the file name 82 (92) shown in FIGS. 3 and 4) for every page of input information, and allots a file name to the information. The file name is supplied from the bus 109 by the operation panel 103. If a page is divided into a plurality of blocks by the block division control circuit 1041, each piece of the divided block information is given a file name. If file names are not supplied from the bus 109, each piece of the block information is not given a file name.

Directory management circuit 1048 manages correlation between files and directories and controls the storage control circuit 1042 to store file information in a designated directory of the storage section 102. The control signal 1053 generated by a command from the operation panel 103 executes directory designation. The control signal 1053 is also generated by a command from the identifier analyzed by the dial/identifier analysis section 107. The directory management circuit 1048 manages directory structure, that is, which page of block is composed in which file and the like.

The input information return control circuit 1043 as well as the main control circuit 1044 constitutes information return control means.

The input information return control circuit 1043 and the main control circuit 1044 execute a control of returning input information in a file designated by the identifier analyzed by the dial/identifier analysis section 107 shown in FIG. 1 as it is or as return information by editing the input information, to the apparatus having a telephone number detected by the dial/identifier analysis section 107. In other words, the input information return control circuit 1043 fetches the file stored in the storage section 102 in accordance with an identifier indicating a request from a facsimile apparatus on the other end of the line for information service, edits and outputs the file to the modem section 106 in accordance with a command, and returns the file as return information to the facsimile apparatus on the other end of the line. If the addition number analyzed by the analysis section 107 is the telephone number of the facsimile apparatus which has transmitted the identifier, the return information is returned to the facsimile apparatus having the telephone number. If the addition number is a telephone number different from that of the apparatus on the other end of the line, then an facsimile apparatus having the telephone number is called to establish line connection and the return information designated by the identifier is transmitted to the apparatus having the telephone number.

The apparatus on the other end of the line or the apparatus to which return information is transmitted can be not only a facsimile apparatus but also a computer having a facsimile function connected to a telephone line.

The associated file detection section 1049 associates a directory with a different directory in the storage section 102.

In addition to means for controlling the entirety of the apparatus of the present invention, the main control circuit 1044 has character recognition means for conducting character recognition processing to the input information read by the scanner section 101.

The management control section 104 allots a number to the input information generated by a scan command input from the operation panel 103 and output from the scanner section 101 or to input information transmitted from a different facsimile apparatus via telephone line 108 and received at the modem section 106 for every page and stores the input information in the storage section 102. The management control section 104 divides the input information stored in the storage section 102 into a plurality of blocks for every page based on the command input from the operation panel 103 and allots numbers to the blocks, respectively.

Furthermore, the management control section 104 correlates input information numbers or divided blocks with file names input from the operation panel 103 based on the command input from the operation panel 103, and stores the input information in the directory designated by the operation panel 103.

When the arrival of a signal is detected at the modem section 106, the dial/identifier analysis section 107 starts analyzing the identifier of the arrived signal. If this identifier requests access to the directory information registered in the directory management circuit 1048 of the management control section 104 or access to input information corresponding to an input unit number allotted when the information has been input to the apparatus of the present invention, the input information or block information in the designated directory of the storage section 102 is returned or transmitted to an apparatus having the identifier received at the modem section 106.

If the access target information associates a plurality of pieces of information with one another, the associated plurality of pieces of information is transmitted to the apparatus having the identifier received at the modem section 106. The information is not transmitted but printed at print section 105 if the identifier requests so.

[Input Information Storage]

Figure 5:
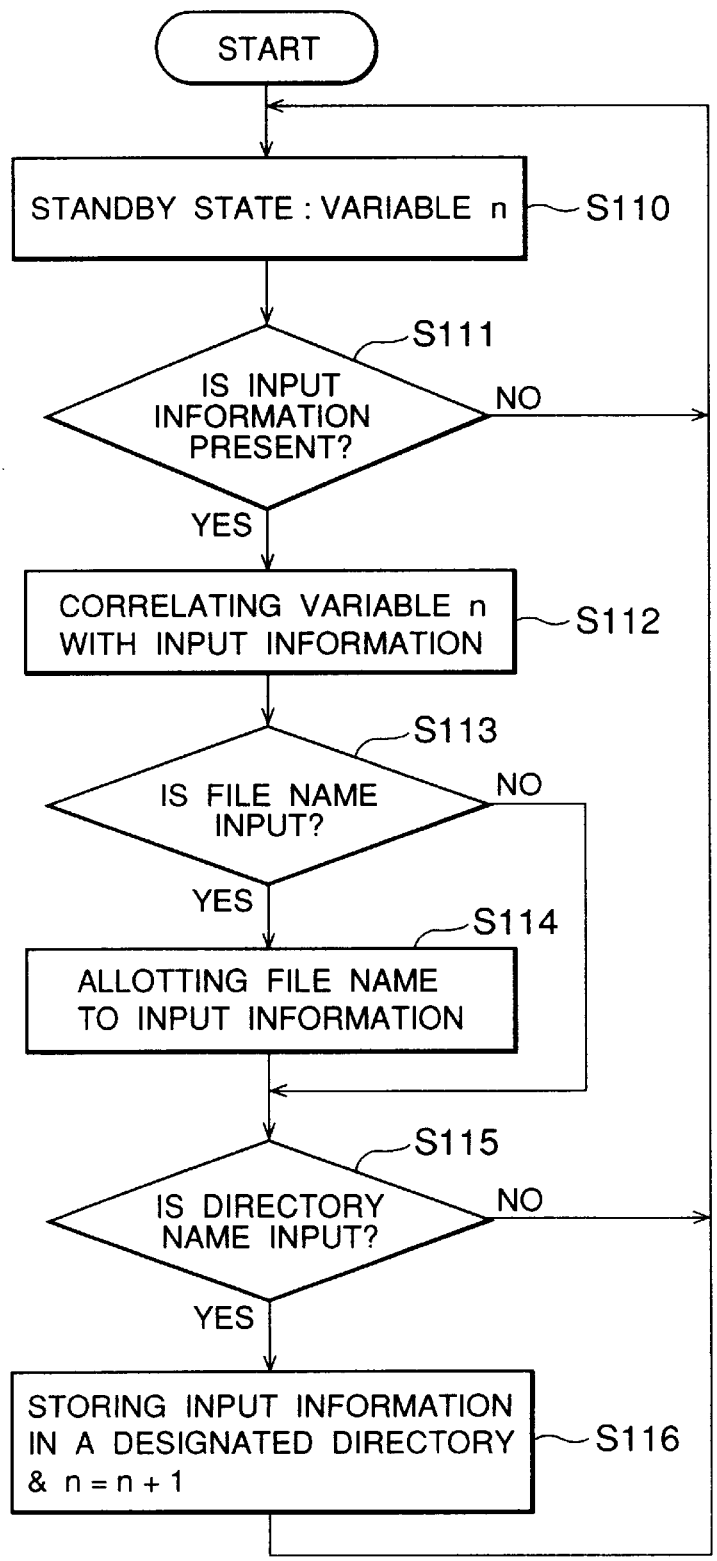
FIG. 5 is a flowchart showing input image storage processing of the facsimile apparatus shown in FIG. 1.

FIG. 5 is a flowchart showing an example of processing in input information storage means of the facsimile apparatus 100 shown in FIG. 1. The facsimile apparatus 100 is in a steady state of awaiting arrival of a signal or start of operation (in Step S110). In the steady state, variable n is set as an initial value in the main control circuit 1044 of the management control section 104.

If a scan command is input from the operation panel 103, the scanner section 101 reads information recorded on a form and generates input information. If facsimile data is received through a telephone line at the modem section 106, the modem section 106 receives the data and converts it into input information. If input information is generated at the scanner section 101 or received at the modem section 106 (in Step S111), the numbering and detection circuit 1045 of the management control section 104 (shown in FIG. 2) allots input information number n to respective pages of the input information (in Step S112).

In case of dividing the input information into a plurality of blocks for every page by a command from the operation panel 103 and storing the blocks, dividing operation is conducted under the control of the block division circuit 1046 shown in FIG. 2. Here, the number n allotted by the numbering and detection circuit 1045 serves as a block identification number.

If a file name is input from the operation panel 103 (in Step S113), the input information received or scanned is allotted the file name under the control of the file-to-number correlation management circuit 1047 (in Step S114). If a directory command is input from the operation panel 103 (in Step S115), the storage control circuit 1042 stores the file of the input information in a designated directory in the storage area of the storage section 102 under the control of the directory management circuit 1048, and the variable n is changed to variable n+1 (in Step S116). If no file name or directory name is input, the input information is stored in a initialization directory as a file name preset by the directory management circuit 1048.

The management control section 104 can, therefore, compose parts of divided information (or block information) among the pages of input information input by the scanner section 101, by storing them in the directory which stores the input information transmitted from the facsimile apparatus on the other end of the line. The section 104 can also compose information input by the scanner section 101 or received at the modem section 106 by storing it in the directory which stores information of different pages.

If the operation panel 103 designates the directory, which stores composite input information, in the storage section 102, the input information can be transmitted by means of a facsimile transmit operation or can be printed out at the print section 105.

[Return and Transmit of Input Information]

Figure 6:
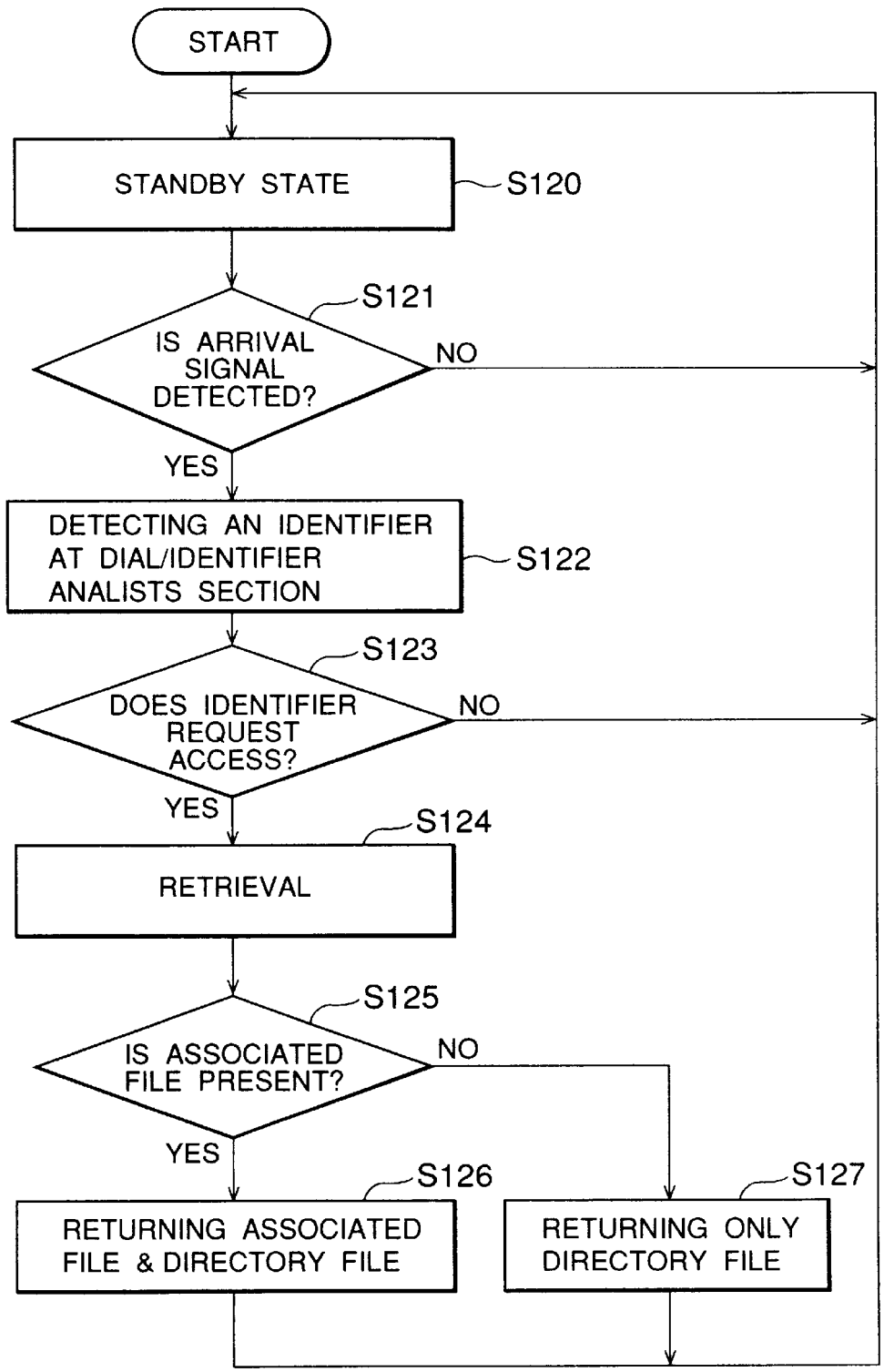
FIG. 6 is a flowchart showing input information return processing of the facsimile apparatus shown in FIG. 1.

FIG. 6 is a flowchart showing an example of the processing of retrieving input information stored in the storage section 104. The facsimile apparatus 100 is in a steady state (in Step S120). If arrival of a signal is detected at the modem section 106 (in Step S121), the main control circuit 1044 of the management control section 104 judges whether facsimile communications protocol used in the signal transmission is standard or non-standard. If it is non-standard, the dial/identifier analysis section 107 detects and analyses the identifier of input data received after detecting the signal arrival (in Step S122). The facsimile apparatus on the other end of the line transmits an identifier by using dial data through non-standard communications protocol. The dial/identifier analysis section 107 thus detects the identifier.

If the identifier analyzed by the main control circuit 1044 contains a request to return information, the input information return control circuit 1043 of the management control section 104 judges whether the identifier analyzed by the dial/identifier analysis section 107 is a request of access to a directory information which has been registered in the directory management circuit 1048 in advance or a request of access to input information corresponding to an input information number or a block identification number (in Step S123).

In case of a request of access to a directory file, the input information return control circuit 1043 retrieves information in the directory, designated by the identifier, from the storage section 102. If case of a request of access to input information corresponding to an input information number or a block identification number, the circuit 1043 retrieves input information or block information having the input information number or the block identification number designated by the identifier, from the storage section 102 (in Step S124). Further, keeping an eye on associated file detection section 1049, whether or not associated directory information which is associated with the retrieved information is present, is judged (in Step S125). If it is present, the associated information as well as the designated directory file or the file of the input information corresponding to the input information number or block identification number is transmitted to the facsimile apparatus on the other end of the line (in Step S126). If it is not present, only the designated directory file or the file corresponding to the input information number or block identification number is transmitted (in Step S127).

If the addition number analyzed by the dial/identifier analysis section 107 is that of the facsimile apparatus on the other end of the line which has transmitted the identifier, the file information of the steps 126 or 127 designated by the identifier is returned to the apparatus on the other end of the line. If the addition number is a number of a terminal or a telephone number of a different facsimile terminal, line connection between the apparatus of the present invention and the apparatus on the other end of the line which has transmitted the identifier is discontinued. Then, the terminal having the number or the telephone number is called and line connection is established between the apparatus of the present invention and the different apparatus. The file information designated by the identifier is then transmitted to the different apparatus having the number.

It is possible to print out the information retrieved in Step S124 at the print section 105 in accordance with the request from the received identifier or the command from the operation panel 103.

[Return of Directory Information Structure]

Figure 7:
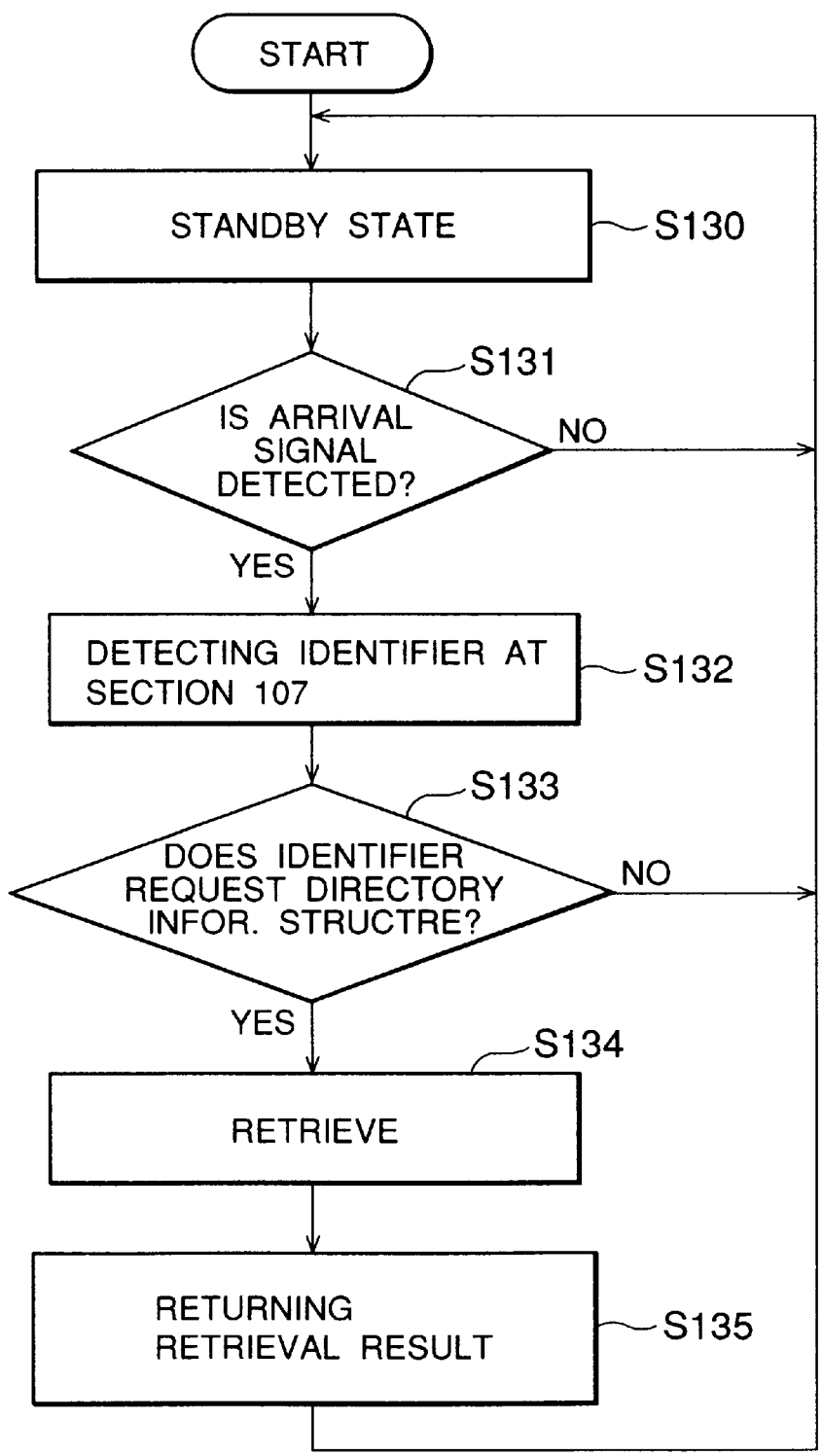
FIG. 7 is a flowchart showing directory structure information return processing of the facsimile apparatus shown in FIG. 1.

FIG. 7 is a flowchart showing processing when the facsimile apparatus on the other end of the line requests the structure of directory information. The facsimile apparatus on the other end of the line requests the structure of directory information so as to grasp the content of the information stored in the storage section 102 in advance. The facsimile apparatus on the other end of the line can judge to-be-returned directory information through the above-described operation if the directory structure is received by this request.

The facsimile apparatus 100 is in a steady state (in Step S130). When arrival of an signal is detected at the modem section 106 (in Step S131), line connection is established. The main control circuit 1044 of the management control section 104 judges whether facsimile communications protocol through which the signal is arrived, is standard or non-standard. If it is non-standard, the dial/identifier analysis section 107 detects and analyzes the identifier of input data received after the signal arrival (in Step S122). The facsimile apparatus on the other end of the line transmits an identifier by using dial data through non-standard protocol. The dial/identifier analysis section 107 thus detects the identifier.

Next, the main control circuit 1044 judges whether or not the identifier analyzed by the dial/identifier analysis section 107 is "a request of directory information structure" which has been registered in the main control circuit 1044 in advance (in Step S133). In case of the request of directory information structure, the main control circuit 1044 retrieves the directory structure, the file name and the information about the access identifier necessary for retrieval are retrieved from the directory management circuit 1048 (in Step S134). The retrieval result is then transmitted as facsimile data, to the facsimile apparatus on the other end of the line which has transmitted the identifier (in Step S135). If the facsimile apparatus on the other end of the line requests printout, the retrieval result is printed out at the print section 165.

Figure 8:
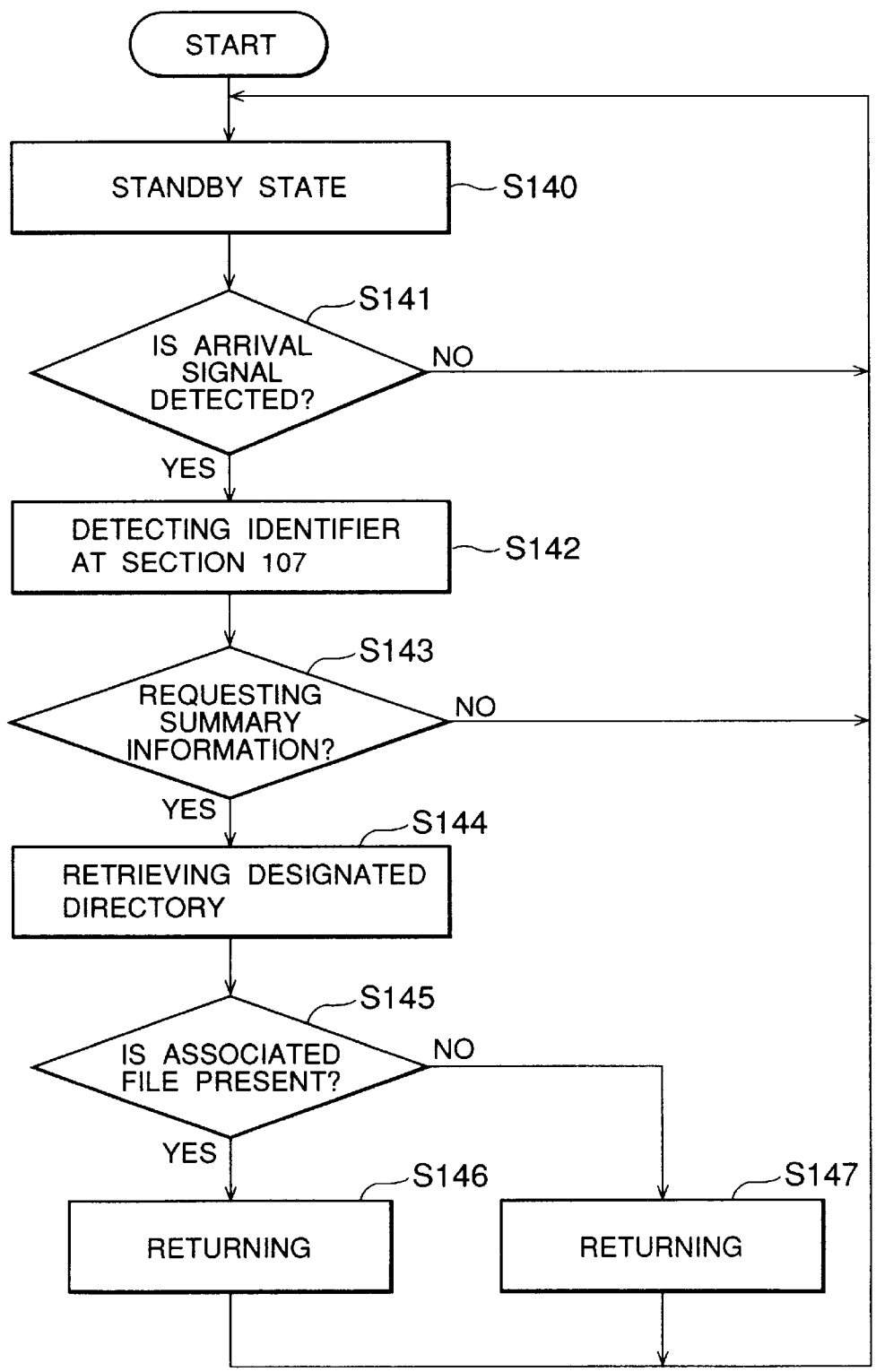
FIG. 8 is a flowchart showing summary information return processing of the facsimile apparatus shown in FIG. 1.

FIG. 8 is a flowchart showing an example of processing of returning part of the input information stored in the directory as summary information.

The facsimile apparatus 100 is in a steady state (in Step S140). When arrival of a signal is detected at the modem section 106 (in Step S141), the dial/identifier analysis section 107 analyzes the identifier of input information received through non-standard protocol (in Step S142).

The main control circuit 1044 of the management control section 104 judges whether or not the identifier is "a request of summary" which has been registered in advance (in Step S143). If it is a summery request, the main control circuit 1044 retrieves information in the directory designated by the identifier with reference to the directory management circuit 1048 (in Step S144). Then, referring to the associated file detection section 1049, the circuit 1044 judges whether or not an associated file is present in the designated directory (in Step S145).

If an associated file is present, the main control circuit 1044 cuts part of the associated file, starting from the lead portion to a certain portion so as to have a unit capacity preset by the operation of the operation panel 103, in the designated directory in the storage section 102 and transmits or prints it out (in Step S146). If no associated file is present, the main control circuit 1044 cuts part of the designated directory file, starting from the lead portion to a certain portion so as to have a unit capacity preset by the operation panel 103, stored in the storage section 102 and transmits or prints it out.

FIG. 8 describes use of part of the input information, starting from the lead portion to a certain portion, to have a preset capacity, as return data. However, the present invention is not restricted to it. Other types of data messages indicating data outline such as thinned-out data and facsimile image compressed data can be used as summary information.

[Directory Association]

Figure 9:
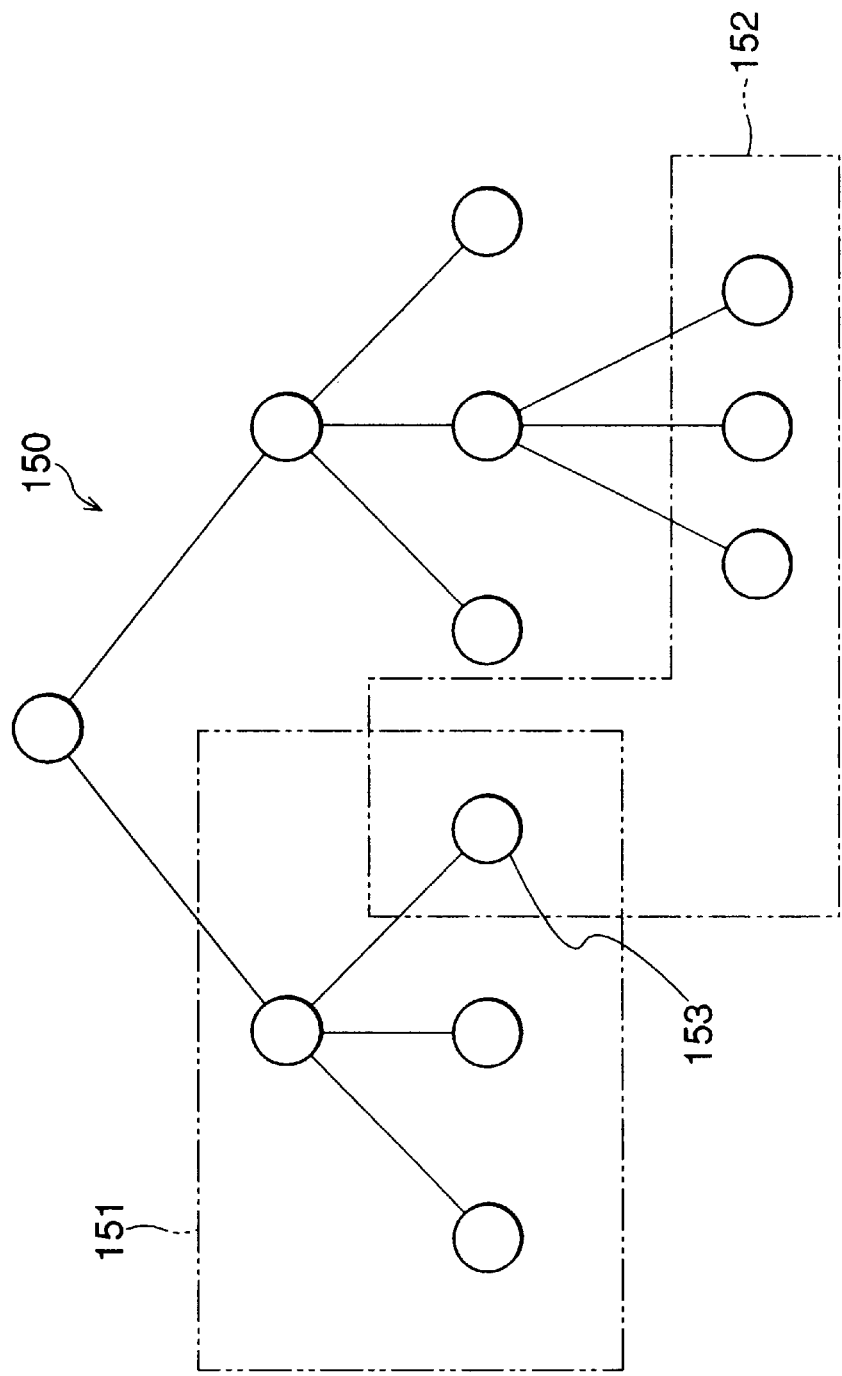
FIG. 9 is an explanatory diagram showing an example of association of directories.

FIG. 9 is an explanatory diagram showing an example of information association in the associated file detection section 1049 shown in FIG. 2. Reference numeral 150 denotes the entirety of directory structure. Reference numeral 151 denotes an example of a directory designated by the identifier. Reference numeral 152 denotes an input information group to show an example of directory association. When the input information in the designated directory is to be returned, part of the input information in the input information group 152 is also returned as the associated information of the designated directory 151. This is because there is overlapped portion 153 between the designated directory 151 and the input information group 152.

To be more specific, the input information group 152 is a group which falls within the range of access to directory information which has been registered in the directory management circuit 1048 of the management control section 104 or which corresponds to the input unit number allotted when the information is input. The input information is made into a group in accordance with a command from the operation panel 103. As shown in FIG. 9, if the overlapped portion 153 exists between the designated directory 151 requested by the identifier and the input information group 152, the designated directory information and the content of the input information group 152 associated with the designated directory information are returned, transmitted or printed out.

[Embodiment of Adding a Clock Section]

Figure 10:
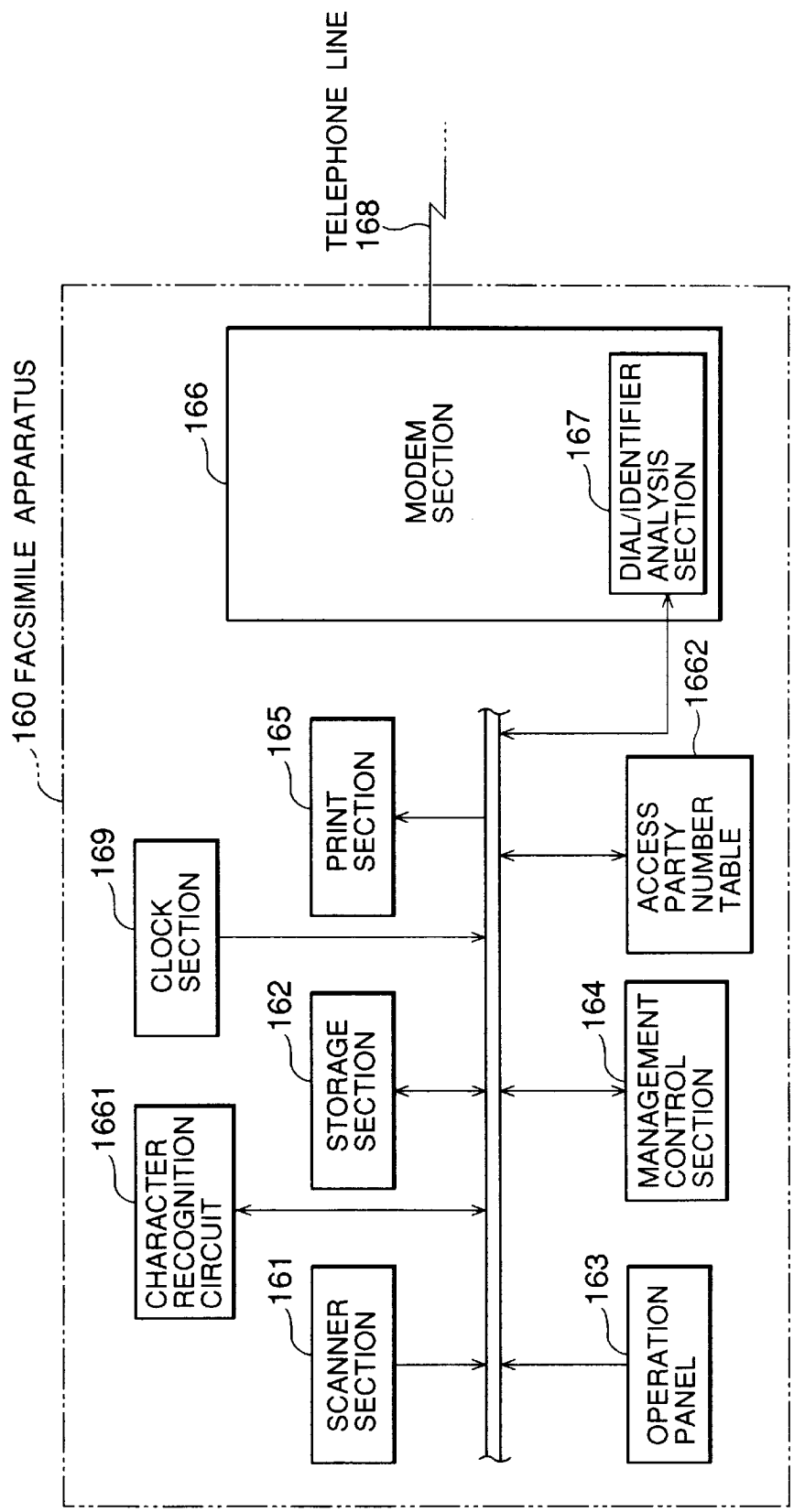
FIG. 10 is a block diagram showing a facsimile apparatus of the second embodiment according to the present invention.

FIG. 10 is a block diagram showing the structure of a second embodiment according to the present invention wherein clock section 169 is added to the facsimile apparatus shown in FIG. 1. In this embodiment, the storage control circuit (corresponding to the storage control circuit 1042 shown in FIG. 2) of management control section 164 provides the input information with detailed addition information by utilizing time information output from the clock section 169. The remaining circuits shown in FIG. 10 are the same as those shown in FIG. 1.

Figure 11:
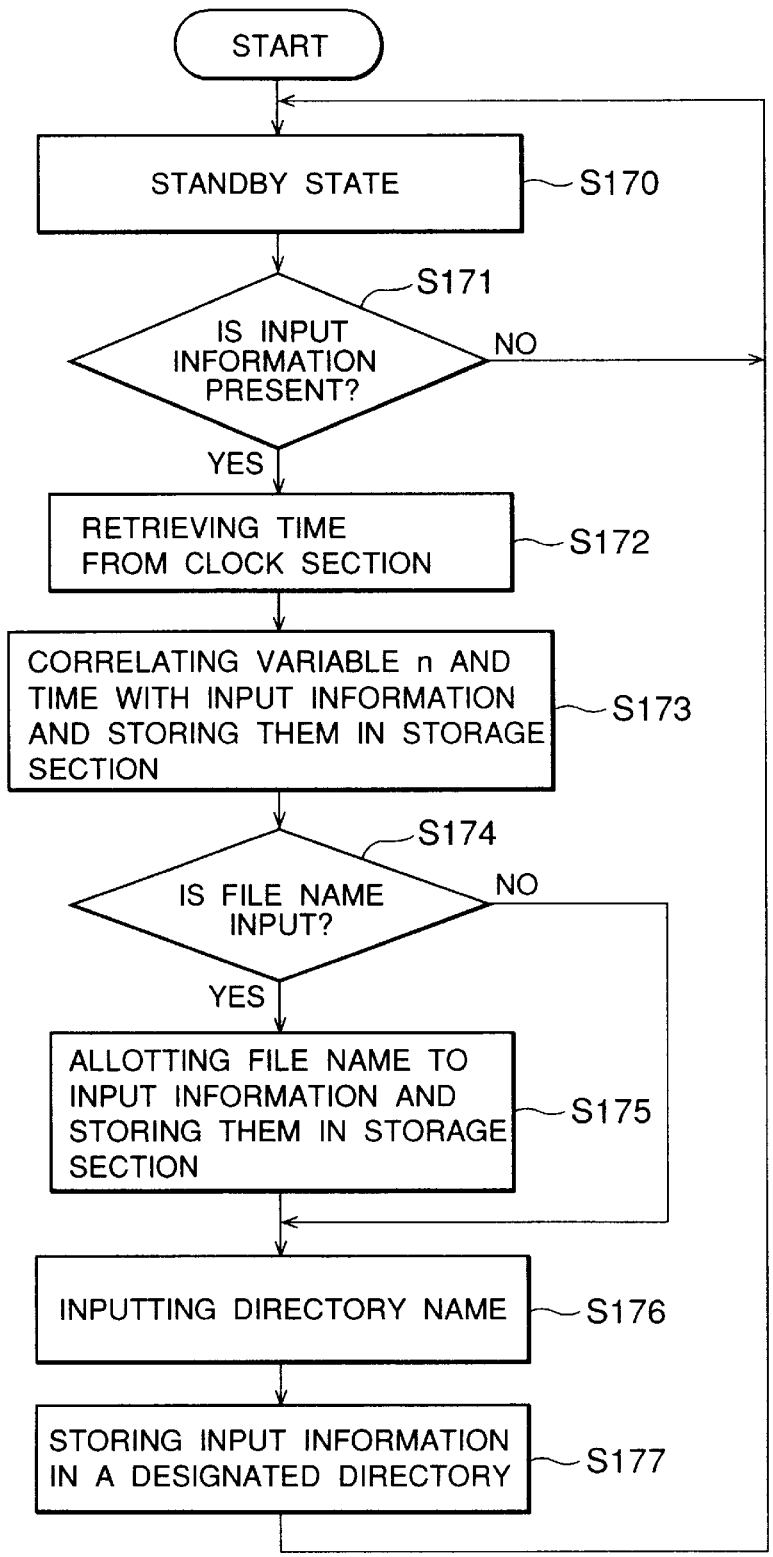
FIG. 11 is a flowchart showing input information storage processing of the facsimile apparatus shown in FIG. 10.

FIG. 11 is a flowchart showing the operation of storing input information in the facsimile apparatus 160 shown in FIG. 10. While the facsimile apparatus 160 is in a steady state of waiting for arrival of a signal or for scan input (in Step S170), input information (scanned input information) is output front the scanner section 161 or input information (received input information) is output from the modem section 166 (in Step S171). If input information is output in this manner, then the management control section 164 detects that the state of the input information has changed and the clock section 169 retrieves the time when the state has been changed (in Step S172).

The input information is stored in the storage section 162 and stored as a file while correlating the input information with time information (in Step S173). Here, if a file name is input from the operation panel 163 (in Step 174), the input information is stored while correlating it with the file name (in Step S175). If a directory name is input (in Step S176), the file is stored in the designated directory (in Step S177). If data having the same file name is updated, the file may be stored while correlating it with rewrite frequency.

[Data Structure of Input Information]

Figure 12:
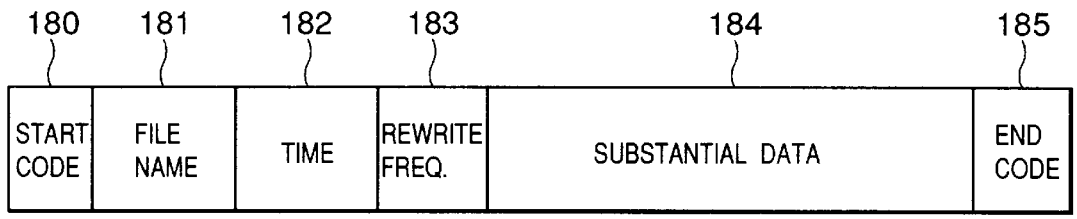
FIGS. 12 and 13 are explanatory diagrams showing the file structure of input information stored in the storage section of the facsimile apparatus shown in FIG. 10.

FIG. 12 shows an example of the structure of the stored file (or stored input information) according to the flowchart shown in FIG. 11. In FIG. 12, the stored file has start code 180, file name 181, time 182, rewrite frequency 183, substantial data 184 and end code 185. The file name 181 can contain an input information number allotted for every page or a block identification number. The clock section 169 can be provided within the management control section 164. Information about time 182 is useful for time management. Information about rewrite frequency 183 is useful to know how frequent the file is used.

Figure 13:
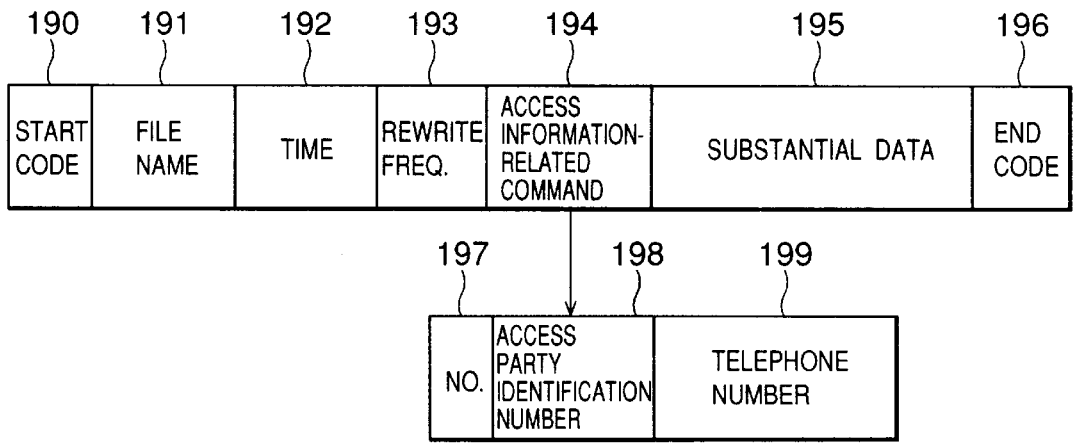

FIG. 13 shows the structure of the stored file in case a telephone number is stored in an access information-related command. In FIG. 13, the file consists of start code 190, file name 191, time 192, rewrite frequency 193, access information-related command 194, substantial data 195 and end code 196. The access information-related command 194 indicates as detailed information, number "No." 197 indicating respective files, access party identification number 198 and telephone number 199. The telephone number of the apparatus on the other end of the line and the identifier thereof both detected by the dial/identifier analysis section 167 are correlated with an access file and stored in the storage section 162.

According to an example shown in FIG. 13, the "No." 197 indicating respective files, the access party identification number 198 and the telephone number on the other end of the line 199 are stored as detailed information indicated by the access information-related command 194 in a different file. It is possible to store them in the access information-related command 194.

Figure 14:
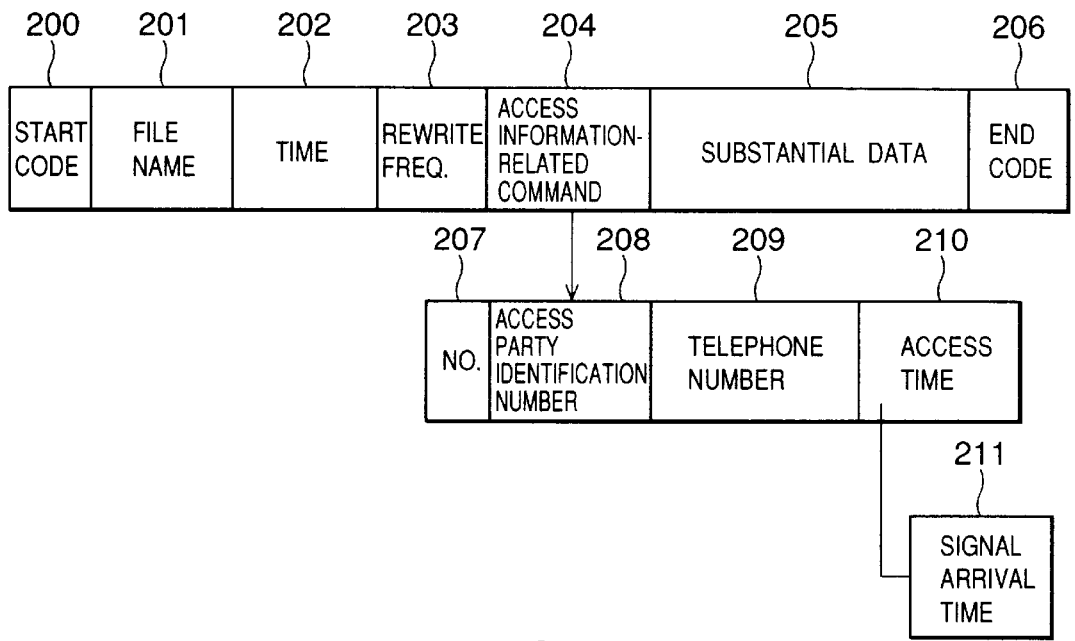
FIGS. 14 and 15 are explanatory diagrams showing an example of another file structure of the input information stored in the storage section of the facsimile apparatus shown in FIG. 10.

FIG. 14 shows an example of the structure of the stored file in case access time is stored as the access information-related command. In FIG. 14, the stored file consists of start code 200, file name 201, time 202, rewrite frequency 203, access information-related command 204, substantial data 205 and end code 206. The access information-related command 204 indicates as detailed information number "No." 207 indicating respective files, access party identification number 208, telephone number 209 on the other end of the line and access time 210.

Moreover, arrival time 211 is stored while associating it with the access time 210. The arrival time 211 is stored in such a manner that arrival of a signal is detected at the modem section 166 to obtain arrival time from the clock section 169 and that the identifier of the apparatus on the other end of the line detected by the dial/identifier analysis section 167 is stored in the storage section 162 while correlating the identifier with the access file. As a result, it is possible to detect the operation state at certain operation time of the facsimile apparatus of the present invention and the file access state.

Figure 15:
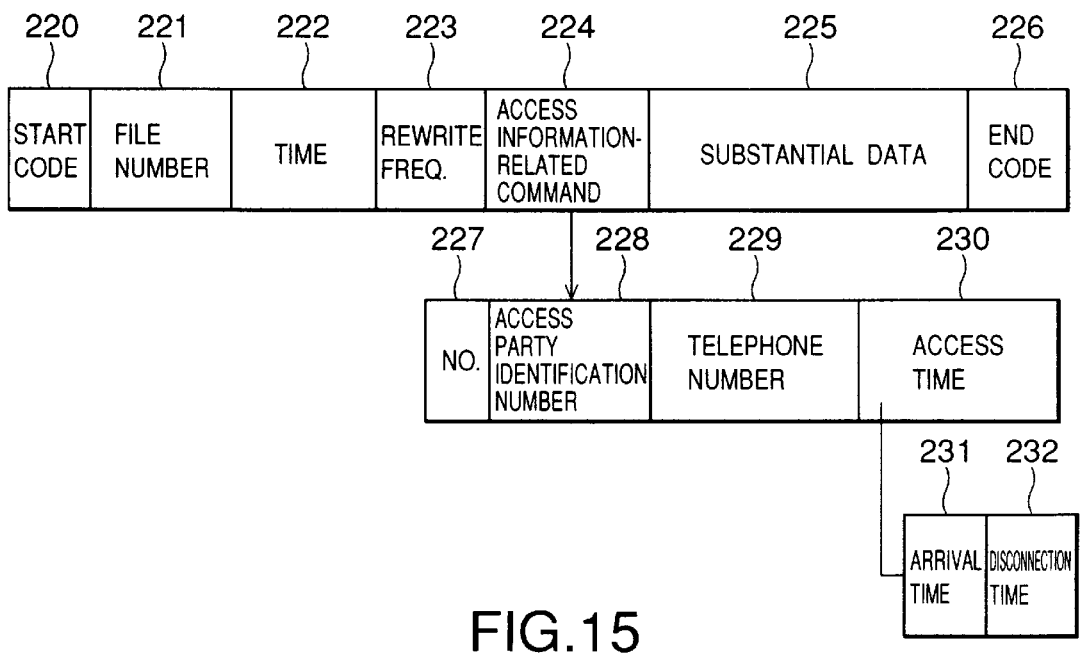

FIG. 15 shows an example of the structure of the stored file which stores arrival time and line disconnection time. In FIG. 15, the stored file consists of start code 220, file name 221, time 222, rewrite frequency 223, access information-related command 224, substantial data 225 and end code 226. The access information-related command 224 indicates, as detailed information, number "No." 272 indicating respective files, access party identification number 228, telephone number of the apparatus on the other end of the line 229 and access time 230.

Moreover, arrival time 231 and line disconnection time 232 are stored, while associating them with the access time 230. The arrival time 231 and the line disconnection time 232 are stored in such a manner that the disconnection of the communication line is detected at the modem section 166, time where the line disconnection is detected is obtained from the clock section 169 and that the identifier of the apparatus on the other end of the line detected by the dial/identifier analysis section 167 is stored in the storage section 162 while correlating the identifier with the access file.

[Access Party Number Table]

Figure 16:
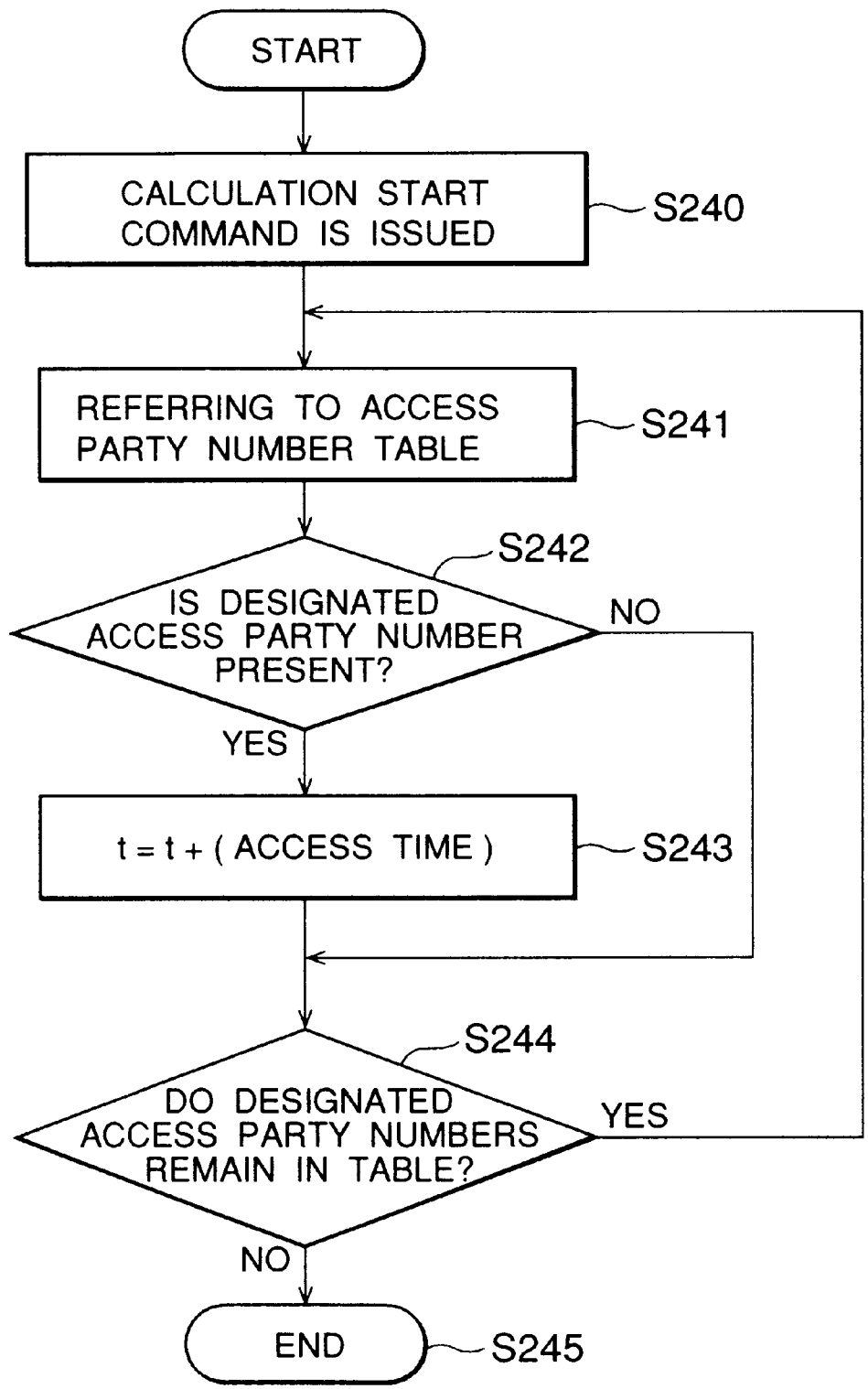
FIG. 16 is a flowchart showing an example of statistical processing with reference to an access party number table in the facsimile apparatus shown in FIG. 10.

FIG. 16 is a flowchart showing an example of statistical processing with reference to access party number table 1662. If a command to start calculation is issued (in Step S240), the record of the designated access party number is first retrieved from the access party number table 1662 (in Step S242). Second, the file access time of the designated access party number is updated (in Step S243). It means that the file access time is added to parameter t.

If a plurality of access party numbers are designated, processing is repeatedly conducted. When the processing is completed, it is confirmed that there remain no designated access party numbers in the table (in Step S244) and that totalization is finished. The file designated by the operation panel 163 is returned to facsimile apparatuses each having the identifier and telephone number which have been stored while being correlated with the access file. It is noted that statistical processing is designed not only for access time but also for respective file units, access party identification numbers, arrival time, line disconnection time, date assignment and retrieval. The statistical processing thus facilitates the management of information service.

Figure 17:
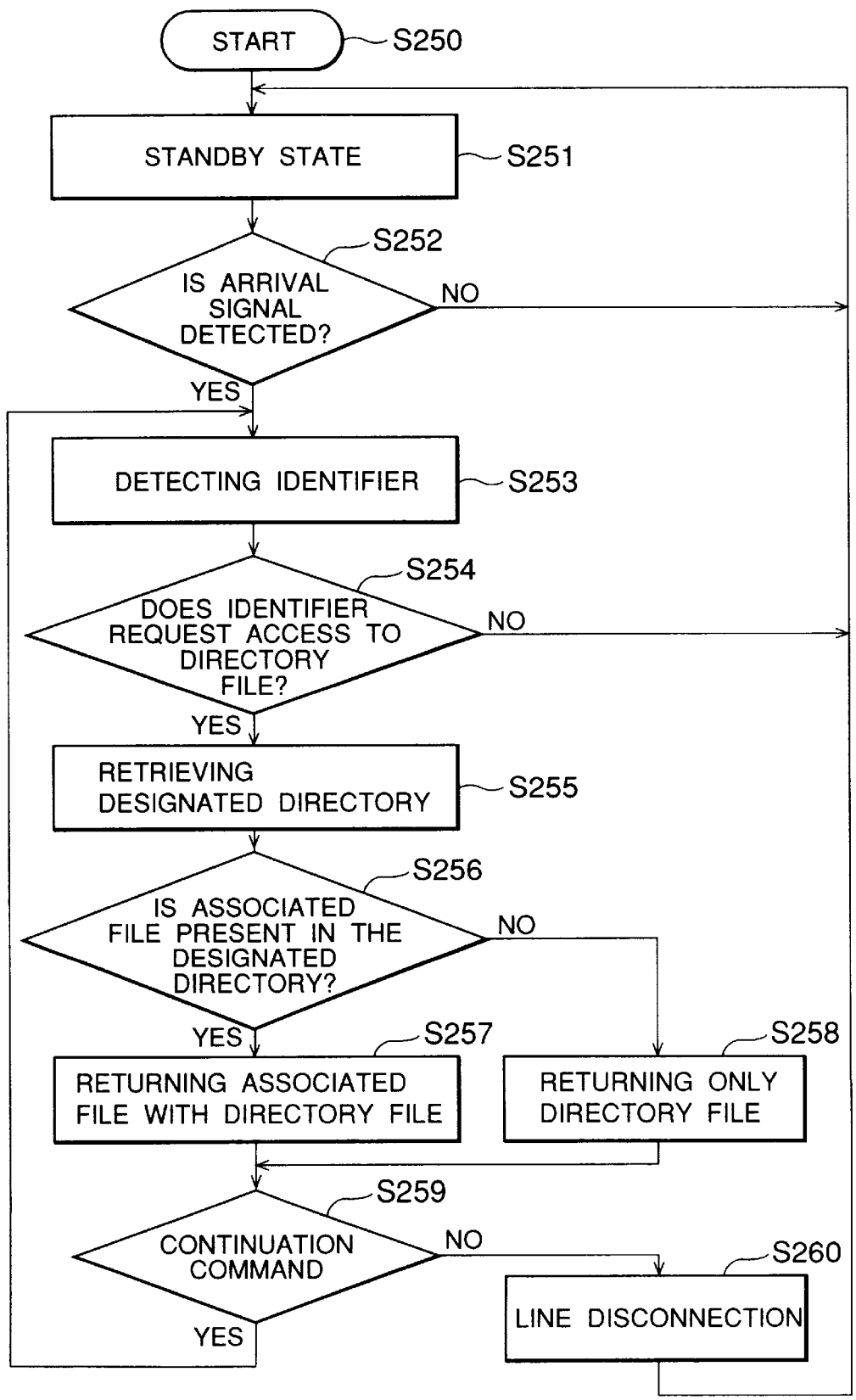
FIG. 17 is a flowchart showing an example of the processing of selecting either the continuation of operation or the line disconnection after returning the input information in the facsimile apparatus shown in FIG. 10.

FIG. 17 is a flowchart showing an example of the operation in case of operation is continued. When operation starts (in Step S250), the facsimile apparatus 169 turns into a steady state, that is, a standby state (in Step S251). If arrival of a signal is detected at the modem section 166 (in Step S252), the dial/identifier analysis section 167 analyzes the identifier (in Step S253). It is judged whether or not the identifier is a request of access to directory information which has been registered in the management control section 164 in advance or access to input information corresponding to the input unit number allotted when the information is input (in Step S254).

In case of request of access to a directory file, it is judged if a file associated with the directory file is present in the designated directory (in Step S256). If it is present, the associated file is returned together with the directory file (in Step S257). If no associated file is present, only the designated directory file is returned (in Step S258).

Furthermore, a command about the continuation of operation is detected (in Step S259). If the detected command is for non-continuation of operation, line is disconnected (in Step S260). Since line is disconnected after one file group has been transmitted, re-dialing is not needed and also file operation can be continued by the remote control of the apparatus on the other end of the line.

It is possible to select automatic line disconnection after file transmission and recovery to a standby state of awaiting directory retrieval request after file transmission based on the command from the operation panel 163. Moreover, it is possible to set the selection of automatic line disconnection after file transmission and recovery to a standby state of awaiting directory retrieval request after file transmission by remote control, based on the command of the identifier of the apparatus on the other end of the line from the dial/identifier detection section 167.

[Character Recognition]

Figure 19:
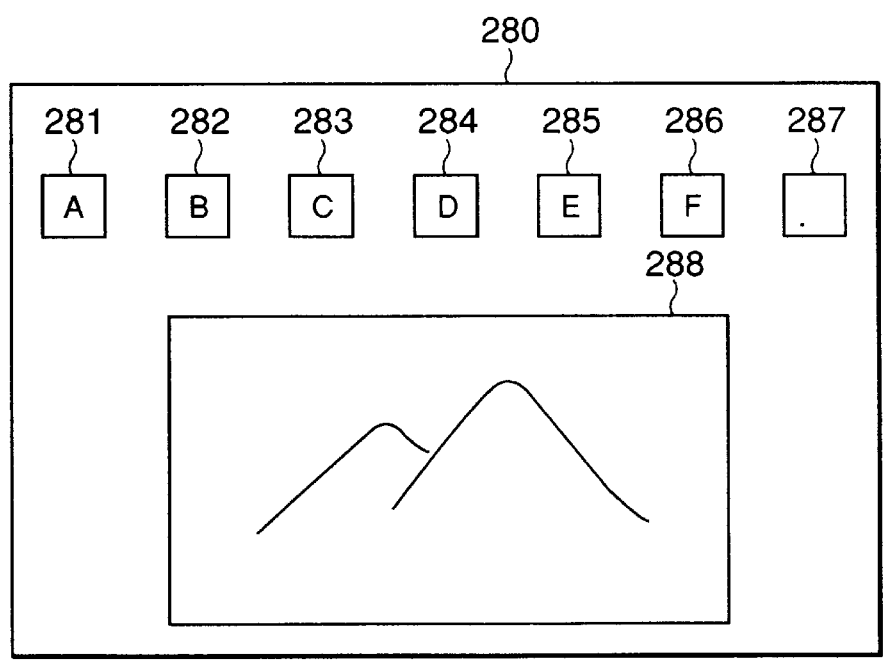
FIG. 19 is an explanatory diagram showing an example of the input information division processing in the facsimile apparatus shown in FIG. 10.

FIG. 19 is an explanatory diagram showing an example of character recognition in character recognition circuit 1661 in the facsimile apparatus 160 shown in FIG. 10. The management control section 164 allots an input information number to input information 280 input from the scanner section 161 or from the modem section 166, and stores the input information 280 in the storage section 162. The character recognition circuit 1661 automatically cuts areas surrounded by empty spaces of the stored input information into image blocks 281 to 288. The circuit 1661 then compares sizes of the image blocks 281 to 288. According to an example of FIG. 19, the image blocks 281 to 287 are the same in size. Character recognition is carried out onto the blocks 281 to 287. The image block 288 having no relation to the other blocks 281 to 287 in size is recognized as an image. The storage sections of the image blocks, that is, pieces of divided information are allotted numbers, respectively, and the blocks are stored in the storage section 162.

In the above example, image blocks are detected based on empty spaces. However, it is possible to detects blocks on color paper based on density difference (or concentration difference per unit area). It is also possible to store recognized characters as a group.

Image blocks are stored in accordance with the steps shown in the flowchart of FIG. 5 so that the blocks can be later used as an index. Specifically, storage sections of the divided information are allotted numbers, respectively in the management control section 164. Alternatively, the image blocks stored in the storage section 162 are expressed on a coordinate input from the operation panel 163 in the management control section 164, and storage sections of composite information can be allotted numbers, respectively.

Figure 20:
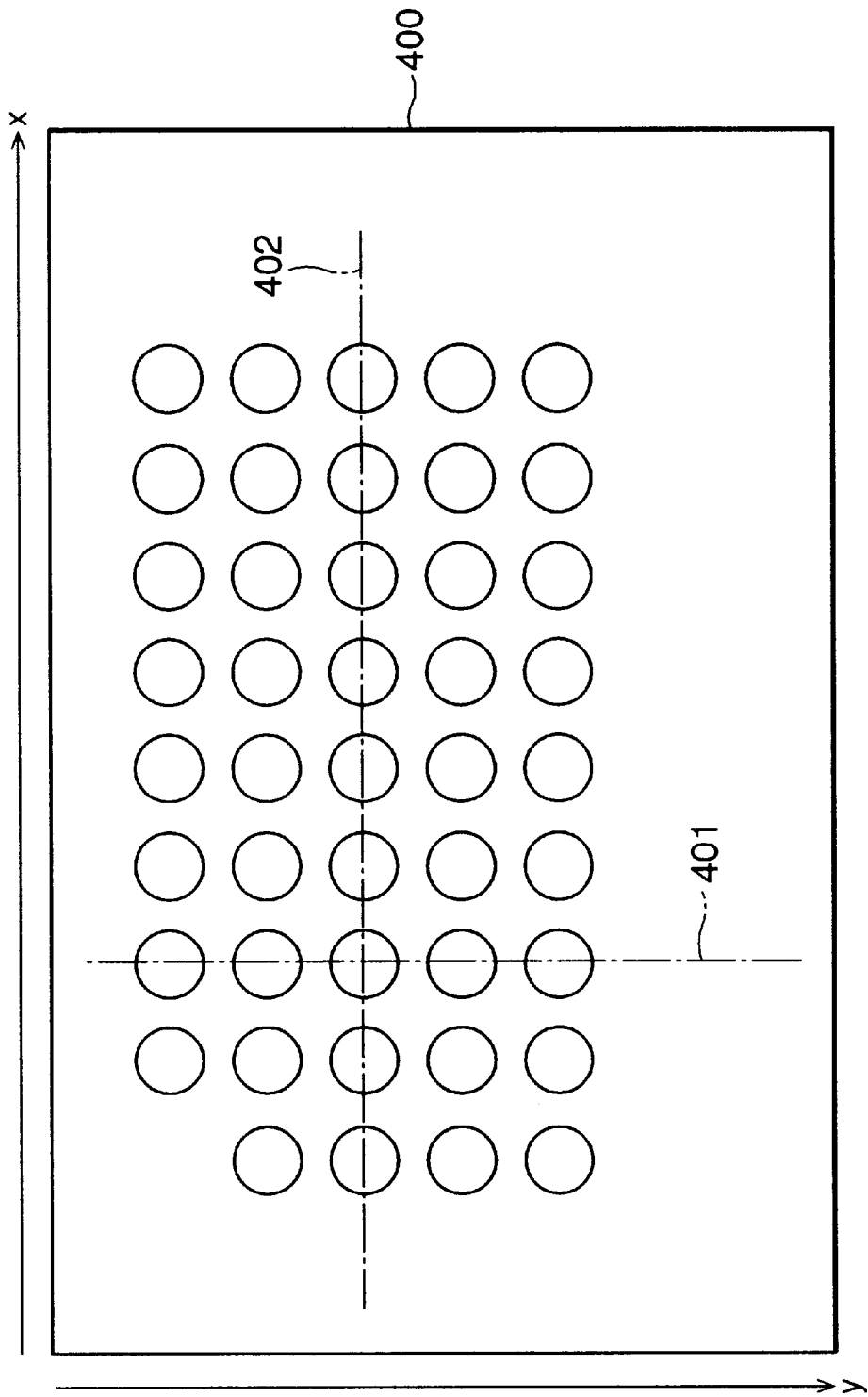
FIG. 20 is an explanatory diagram of the character recognition method in the facsimile apparatus shown in FIG. 10.

FIG. 20 is an explanatory diagram showing an example of carrying out character recognition onto, for example, a telephone number in the character recognition circuit 1661 of the facsimile apparatus 160 shown in FIG. 10. When data 400 fetched from the scanner section 161 is displayed on the operation panel 163, the data 400 is expressed on a X-Y coordinate and images on two points, y-coordinate 402 and x-coordinate 401, designated by the operation panel 163 are read. If the images are recognized as characters as in the case of FIG. 19, they are stored in a table correlating a telephone number with an identifier number in the storage section 162.

Figure 21:
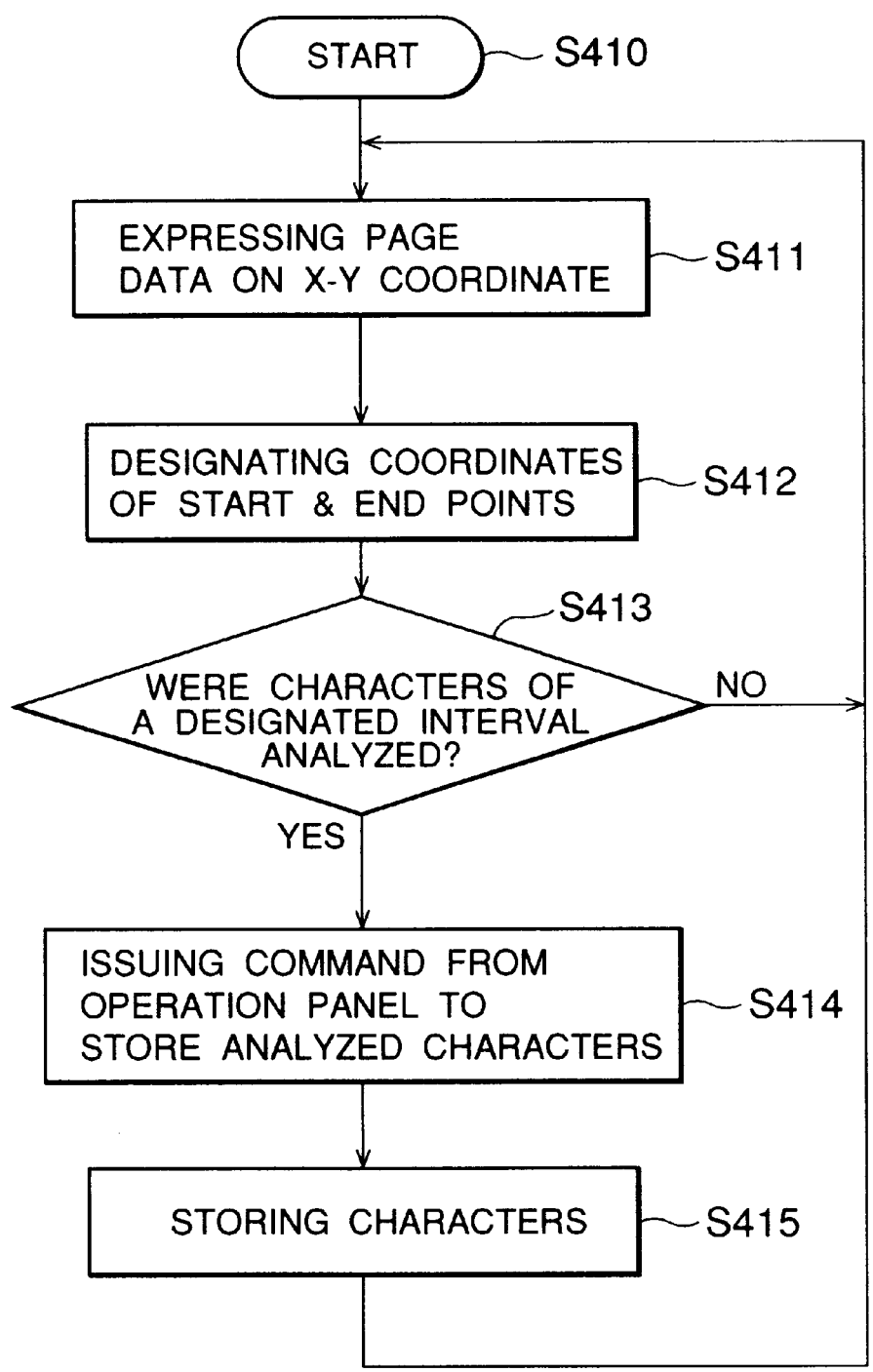
FIG. 21 is a flowchart showing an example of information reading operation during character recognition processing in the facsimile apparatus shown in FIG. 10.

FIG. 21 is a flowchart showing the above-described operation. After a start command is issued (in Step S410), the character recognition circuit 1661 causes page data to be expressed on an X-Y coordinate (in Step S411). Coordinates of start and end points input from the operation panel 163 are fetched (in Step S412). Character analysis is conducted on the designated interval. It is judged whether or not the character analysis has been finished (in Step S413). If it is finished, a command to store analyzed characters is issued from the operation panel 153 (in Step S414) and the analyzed characters are stored accordingly (in Step S415). In this case, not only numeric characters but also alphabetic characters and kanji (or Chinese) characters can be analyzed.

Figure 22:
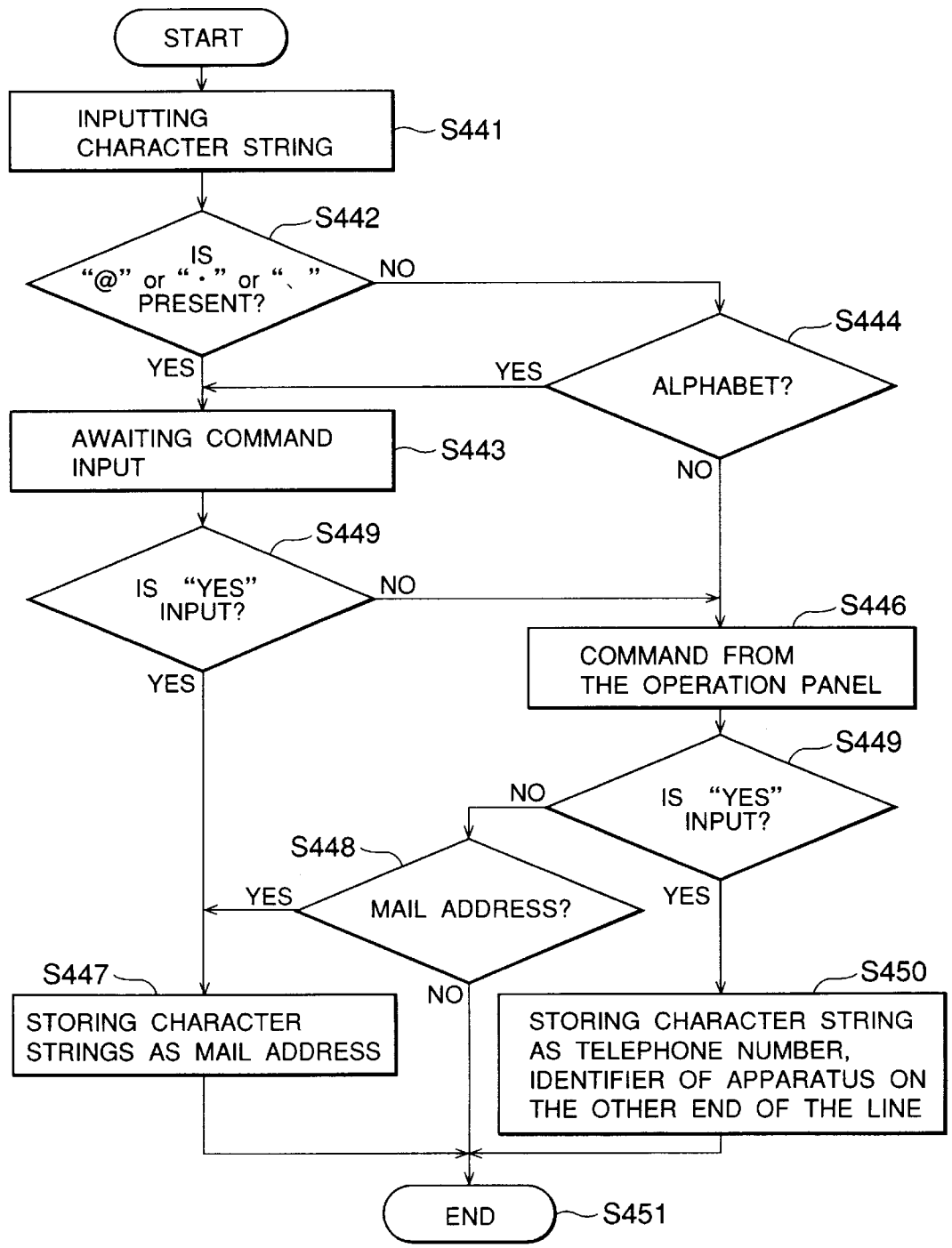
FIG. 22 is a flowchart showing an example of processing in case a character recognition result is stored as a telephone number or a mail address.

FIG. 22 is a flowchart showing an example of registering a character analysis result as an E-mail address. When a start command is issued (in Step S440), the character recognition circuit 1661 recognizes characters of data fetched by the scanner section 161 and inputs a string of the recognized characters (in Step S441). The circuit 1661 reads numeric values between the interval the coordinates of which have been designated by the operation panel 163 in advance, and retrieves "@" and "." from the input character string (in Step S442).

If "@" and "." are retrieved and mail address registration command is issued from the operation panel 163 (in Step 445?), then the circuit 1661 judges the input character string is an E-mail address and stores the input string in the storage section 162 while associating it with a compacted dial telephone number.

If a predetermined character code is not retrieved from the string, whether or not the input character string is registered as a telephone number depends on a command from the operation panel 163. If "Yes" is input (in Step S449), the input character string is stored as a telephone number and an identifier of the facsimile apparatus on the end of the line (in Step S450). The command is not restricted for the determination to register an input character string as an E-mail address. It can be applied to the determination to correlate an input character string with compacted dial or a stored file. It is also possible to use a mail address to constitute a correlation file group or reference file group.

A mail address, a telephone number and an identifier fetched from the scanner section 161 as described above can be used to store input information in the storage section 162 while associating them with a compacted dial and to transmit the input information. The input information is input not only from the scanner section 161 but also from the modem section 166. That is, arrival of a signal is detected at the modem section 166 and the identifier is analyzed in the dial/identifier analysis section 167. If the identifier requests access to directory information which has been registered in the management control section 164 in advance or requests to store input information corresponding to an input unit number allotted when the information is input, the information in the designated directory is stored in a multiple-correlation storage section. It is noted that the communication line according to the present invention is not restricted to an analog telephone switched line.

Figure 23:
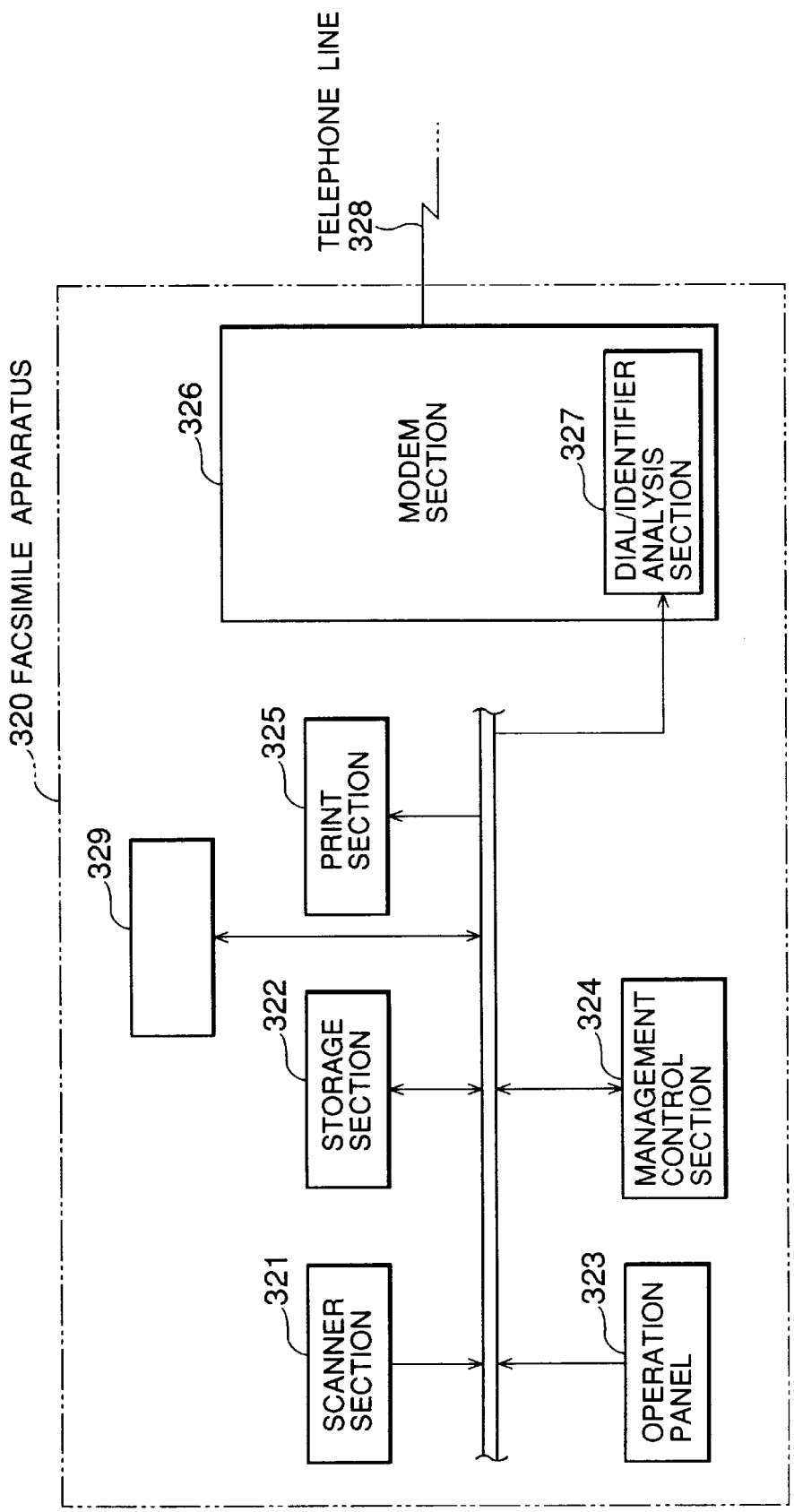
FIG. 23 is a block diagram showing a facsimile apparatus of the third embodiment according to the present invention.

FIG. 23 is a block diagram showing the structure of the facsimile apparatus provided with serial communication section 309 of a third embodiment according to the present invention. Facsimile apparatus 320 comprises scanner section 321, storage section 322, operation panel 323, management control section 324, print section 325, modem section 326, dial/identifier analysis section 327 and the serial communication section 309. A command from the operation panel 323, file input and the like are carried out through the serial communication section 237 by using a predetermined control code or a format shown in, for example, FIG. 12.

A printer interface, a serial interface used for a computer communication interface or a LAN interface can serve as the serial communication section 309.

[Scanner Section]

Figure 24:
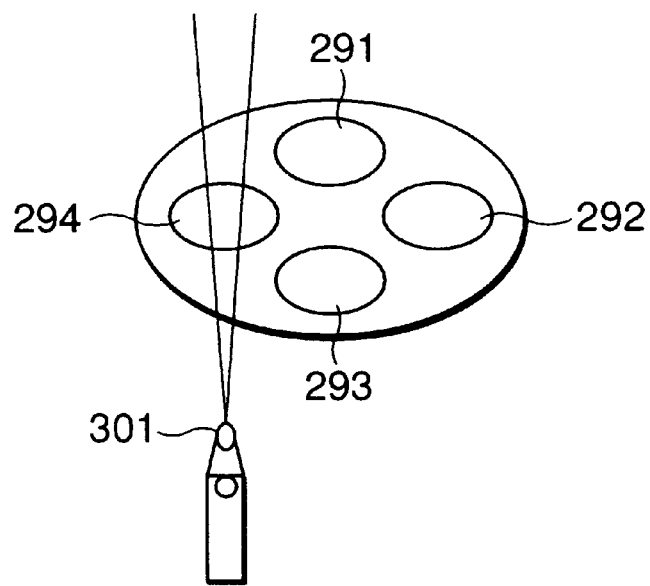
FIG. 24 is a schematic perspective view showing a scanner section provided with a filter portion in the first to third embodiments according to the present invention.

FIG. 24 is an explanatory diagram showing the structure of the scanner sections 101, 161 and 321 of the facsimile apparatuses shown in FIGS. 1, 10 and 23, respectively. In FIG. 24, the scanner section has a filter portion 290 on a lens. The filter portion 290 consists of filters 291 to 294 which are different in color from one another. The scanner section selects either three filter primary colors or no filter in accordance with a command from the operation panel and then rotates the filter portion. An image read through the filters is stored while correlating the image with a filter color number. Although FIG. 24 illustrates four filters, the number of filters can be changed, depending on the structure of the print section 165 or the like.

Figure 25:
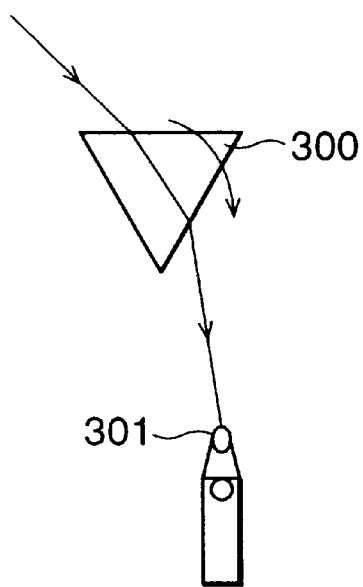
FIG. 25 is a schematic plan view showing a scanner section provided with a prism filter in the first to third embodiments according to the present invention.

FIG. 25 is a diagram showing another example of the structure of the scanner section in the facsimile apparatus. In FIG. 25, prism filter 300 is provided at lens 301 of the scanner portion. A rotation angle of the prism filter 300 is selected in accordance with a command from the operation panel. A filter color number and a scan data file are correlated with each other in accordance with the filter rotation angle and stored in the storage section.

Figure 26:
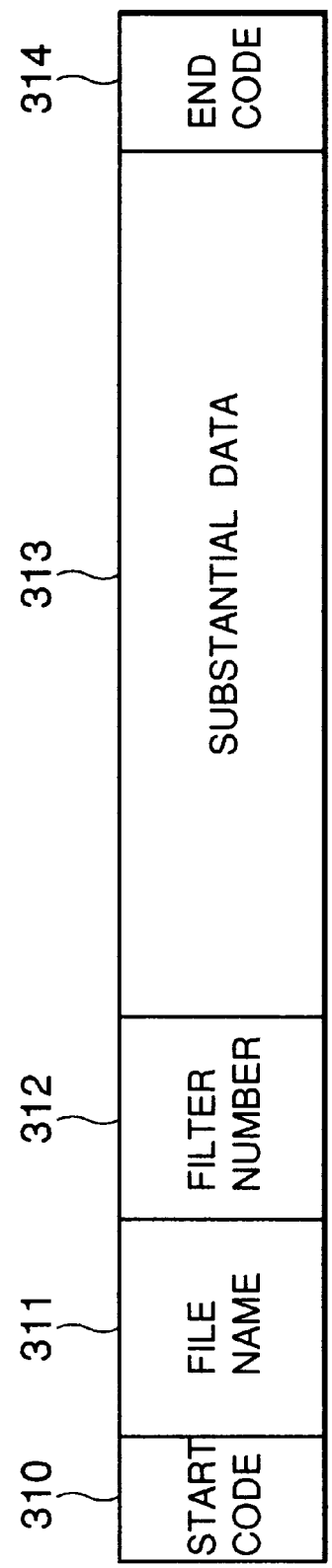
FIG. 26 shows the file structure of the input information in the storage section when the scanner section is used shown in FIG. 24 or 25.

FIG. 26 is an explanatory diagram showing an example of a file format stored in the storage section if the filters shown in FIGS. 24 and 25 are used. The scanner data file shown in FIG. 26 consists of start code 310, file name 311, filter number 312, substantial data 313 and end code 314. The management control section reads the filter number and the scanner data file from the storage section, and outputs scan data to the print section using ink and image plane density corresponding to the filter number.

Figure 27:
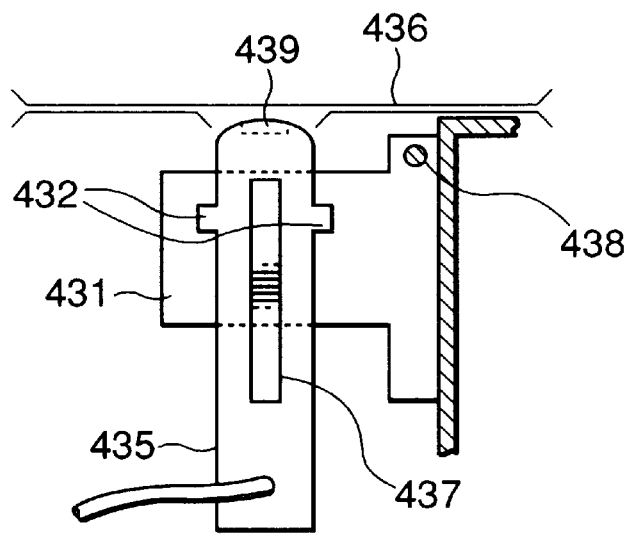
FIG. 27 is a front diagram showing another structure of the scanner section in the first to third embodiments according to the present invention.
Figure 28:
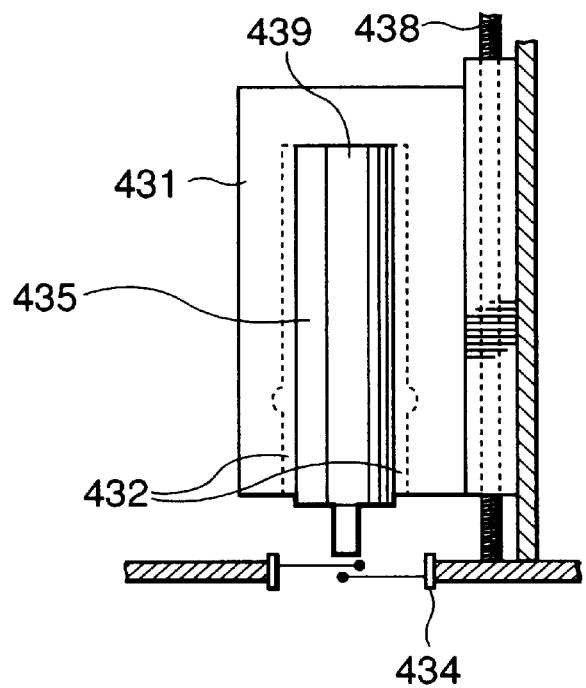
FIG. 28 is a plan view in which the scanner section shown in FIG. 27 is seen from the tip portion side of the scanner main body.
Figure 29:
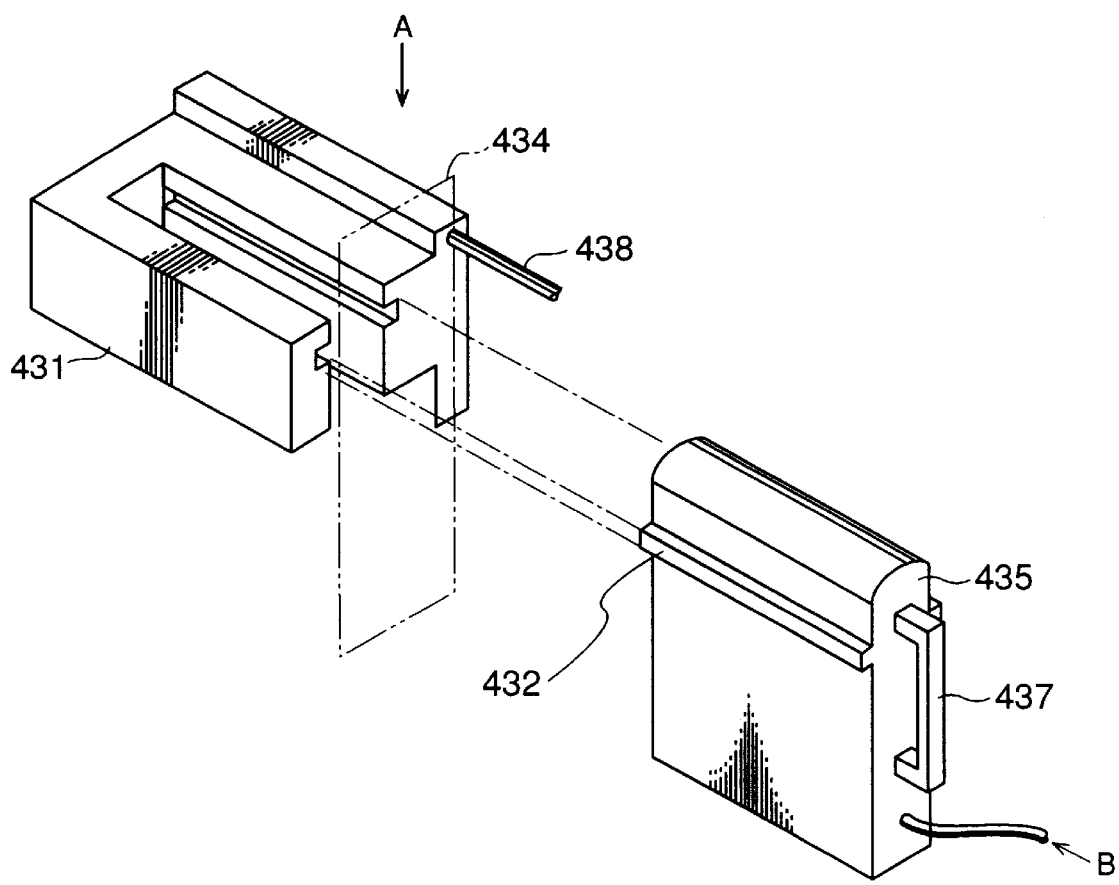
FIG. 29 is an exploded perspective view of the scanner section shown in FIGS. 27 and 28.
Figure 30:
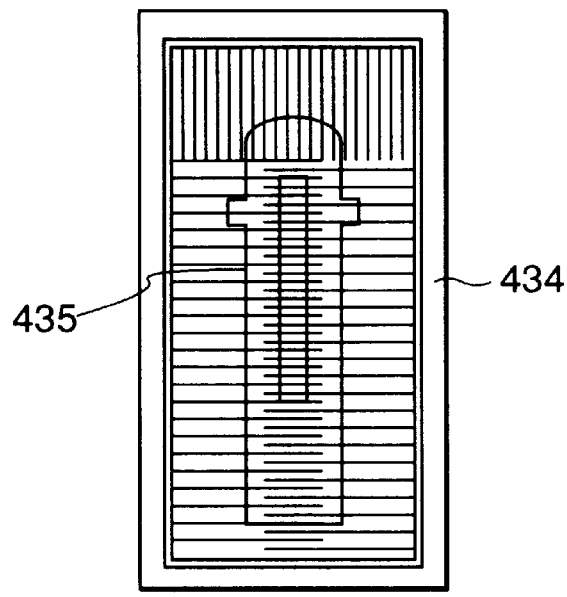
FIG. 30 is a plan view in which the scanner section shown in FIGS. 27 to 29 is seen from the brush side.

FIG. 27 is a front view showing another example of the stricture of the scanner portions 101, 161 and 321 shown in FIGS. 1, 10 and 23, respectively. The scanner portion comprises CCD sensor 439 for converting receiving light into an electric signal, scanner main body 435 for supporting the CCD sensor 439, holder 431 provided on the outer surface of the scanner main body 435 and guide 434 engaged with the holder 431. As shown in FIGS. 28 and 29, the output port of the holder 434, from which the scanner main body 435 is fetched, is provided with brush 434. The brush 434 cleans the scanner main body 435 when the body 435 is inserted into the holder 434. FIG. 30 is a front view of the brush 434.

The scanner main body 435 is detachable from the facsimile apparatus. The holder 431 is arranged along the operation panel 103, 163 and 323 shown in FIGS. 1, 10 and 23, respectively. The holder 431 holds the scanner main body 435 right under carrier path 436. The holder 431 has guide screw 438 which moves the scanner main body 435 with the holder 431 in the main scanning direction of the carrier path 436.

Figure 31:
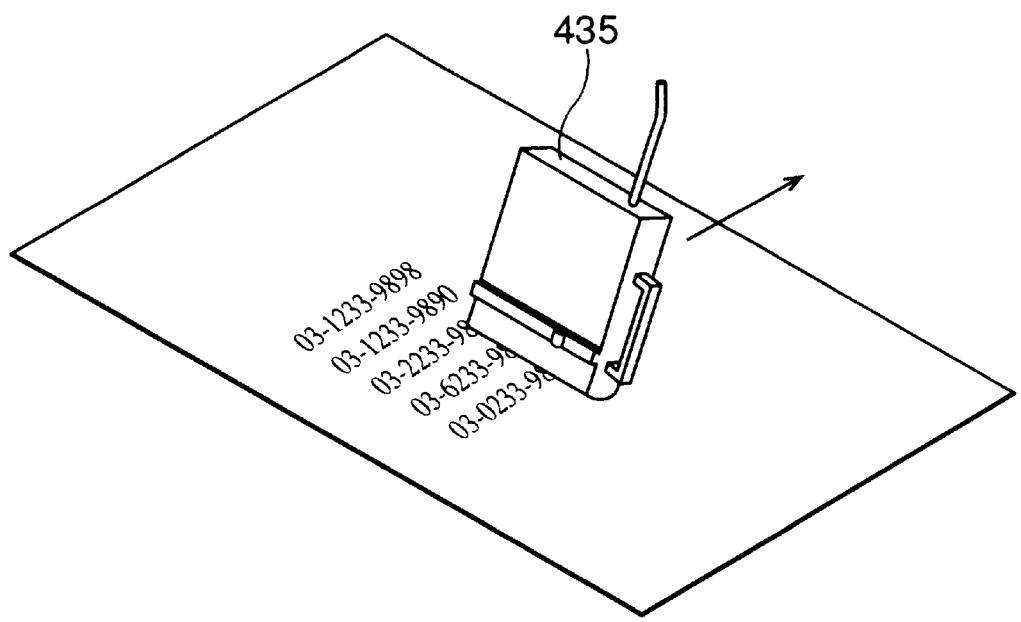
FIG. 31 is a perspective view showing a state of scanning a form at the scanner section shown in FIGS. 27 to 30.

The detachable scanner main body 435 can be utilized to read telephone numbers written or printed on various types of documents, such as a business card, as shown in FIG. 31. The read input image is divided and character recognition is further conducted. As a result, there is no need to input telephone numbers by key operation at the operation panel. Therefore, the detachable scanner main body of this type is particularly useful when it is necessary to register many telephone numbers in information service.

In addition, the detachable scanner main body 435 can read an image which cannot be read by the forms feed mechanism of an ordinary facsimile apparatus. Due to this, to perform information service of, for example, transmitting part of copies of a book, the scanner main body 435 can directly read the book without copying it.

FIGS. 27 through 31 illustrate that a cable is used as a information transfer medium from the scanner section to the management control section. However, not only the wire cable but also wireless or infrared communication can be used.

As can be understood from the above description of the embodiments, the present invention which provides means for dealing with data fetched by the scanner section by dividing the image plane thereof, can advantageously improve operability and shorten operation time. Moreover, the present invention can advantageously share with another facsimile apparatus or other equipment on the network, means for dividing and then storing data fetched by the scanner section and for composing and then using the divided data.

What is claimed is:

1. A facsimile apparatus comprising:

a scanner for reading information recorded on a form;

command input means for inputting a command from an operator;

communication means for transmitting and receiving a signal through a communication line;

storage means for storing input information read by said scanner and input information received at said communication means;

analysis means for receiving an identifier transmitted in a facsimile protocol to said communication means from a facsimile apparatus on the other end of the communication line and for analyzing it; and control means;

said control means comprising:

input information division means for dividing input information output from said scanner;

storage control means for controlling said storage means to store the input information divided by said input information means in a designated directory of said storage means in accordance with the command of said command input means; and transmit control means for controlling said storage control means to read input information associated with the identifier analyzed by said analysis means for controlling said communication means to transmit the divided input information directed by the identifier to the facsimile apparatus on the other end of the communication line.

2. The facsimile apparatus according to claim 1, wherein said input information division means for dividing input information output from said scanner and input information output from said communication means.

3. The facsimile apparatus according to claim 1, wherein said transmit control means controls the communication means to transmit input information in a first directory of said storage means to said facsimile apparatus on the other end of the line if the identifier analyzed by said analysis means designates said first directory.

4. The facsimile apparatus according to claim 1, further comprising a printer for printing out input information associated with the identifier analyzed by said analysis means based on the command of said command input means.

5. The facsimile apparatus according to claim 1, wherein said transmit control means controls said communication means to transmit a structure of a directory in said storage means to said facsimile apparatus on the other end of the line, if the identifier analyzed by said analysis means requests the structure of the directory in said storage means.

6. The facsimile apparatus according to claim 1, wherein said transmit control means controls said communication means to transmit part of respective pieces of input information stored in said storage means to said facsimile apparatus on the other end of the line, if the identifier analyzed by said analysis means requests summary information of the respective pieces of input information stored in said storage means.

7. The facsimile apparatus according to claim 1, wherein said control means further comprises directory association means for associating respective directories in said storage means based on the command of said command input means, and said transmit control means controls said communication means to transmit input information in a directory necessary to said facsimile apparatus on the other end of the line and associated input information stored in a directory associated with said directory of the input information by said directory association means, to said facsimile apparatus on the other end of the line through said modem.

8. The facsimile apparatus according to claim 1, wherein a clock section for outputting time information, is connected to said control means, and said storage control means stores the time information output from said clock section as well as said input information in said storage means when said input information is stored in said storage means.

9. The facsimile apparatus according to claim 1, wherein said storage control means stores number of rewrite times as well as said input information if said input information to be stored in said storage means is overwritten in a single directory.

10. The facsimile apparatus according to claim 8, wherein said storage control means detects said time information from said clock section when input information is received at said modem, adds said time information to input information output from said modem and then stores said time information as well as said input information in said storage means.

11. The facsimile apparatus according to claim 8, wherein said storage control means requests said time information of said clock section when reception of said input information is finished at said modem and the telephone line is disconnected, and said storage control means adds time information about line disconnection time output from said clock section to input information output from said modem and stores said time information as well as said input information in said storage means.

12. The facsimile apparatus according to claim 8, wherein said storage control means detects access time from said information reception time to line disconnection time based on an output of said clock section, and said storage control means adds said access time information to input information output from said modem and stores said access time information as well as said input information in said storage means.

13. The facsimile apparatus according to claim 1, wherein said input information division means comprises density-based division function for dividing said input information into a plurality of image blocks based on the image plane density of said input information, said plurality of image blocks being areas having different image plane densities.

14. The facsimile apparatus according to claim 1, wherein said input information division means comprises a empty space-based division function for detecting empty spaces of said input information and for dividing said input information into a plurality of image blocks based on said detected spaces.

15. The facsimile apparatus according to claim 1, further comprising character recognition means for recognizing characters based on said input information, wherein said character recognition means comprises a target setting function for, if some of the image blocks, into which the input information is divided by said input information division means, have a similar size in a predetermined range, setting said image blocks having the similar size as character recognition targets, and said storage control means comprises a recognition result storage function for composing character recognition results of respective image blocks set by said target setting function in an order according to a positional relationship of said image blocks, and storing said character recognition results in said storage means.

16. A facsimile apparatus comprising:

a scanner for reading information recorded on a form;

command input means for inputting a command from an operator;

communication control means transmitting and receiving a signal through a telephone line;

storage means for storing input information read by said scanner and input information received at said communication means;

analysis means for analyzing number data received from a facsimile apparatus on the other end of the line and analyzing an identifier thereof received from a facsimile apparatus on the other end of the line; and control means, wherein said control means comprises:

input information division means for dividing input information output from said scanner;

storage control means for controlling the apparatus to store the input information divided by said input information division means in a designated directory of said storage means in accordance with the command of said command input means; and transmit control means for controlling said storage control means to read input information associated with the identifier analyzed by said analysis means from said storage means, and for controlling said communication control means to transmit the input information associated with the identifier to a terminal corresponding to the number data analyzed by the analysis circuit.

17. The facsimile apparatus according to claim 16, wherein said input information division means for dividing input information output from said scanner and input information output from said communication means.

18. The facsimile apparatus according to claim 16, wherein said transmit control means controls said communication control means to transmit input information in a first directory to said terminal if the identifier analyzed by said analysis means designates said first directory.

* * * * *